(12) United States Patent
Collie et al.

(10) Patent No.: US 10,697,398 B2
(45) Date of Patent: Jun. 30, 2020

(54) BATTERYLESS DUAL FUEL ENGINE WITH LIQUID FUEL CUT-OFF

(71) Applicant: Champion Engine Technology, LLC, Sussex, WI (US)

(72) Inventors: Kendall J. Collie, Anaheim Hills, CA (US); Mark J. Sarder, Waukesha, WI (US); Aleko D. Sotiriades, Cedarburg, WI (US); James J. Dehn, Brookfield, WI (US); Leigh Jenison, Hartland, WI (US); Hiroaki Sato, Brookfield, WI (US)

(73) Assignee: Champion Power Equipment, Inc., Santa Fe Springs, CA (US)

( * ) Notice: Subject to any disclaimer, the term of this patent is extended or adjusted under 35 U.S.C. 154(b) by 147 days.

(21) Appl. No.: 14/925,441

(22) Filed: Oct. 28, 2015

(65) Prior Publication Data

US 2016/0363099 A1 Dec. 15, 2016

Related U.S. Application Data

(63) Continuation-in-part of application No. 14/738,060, filed on Jun. 12, 2015.

(51) Int. Cl.
*F02M 17/38* (2006.01)
*F02M 13/08* (2006.01)
(Continued)

(52) U.S. Cl.
CPC ............. *F02M 17/38* (2013.01); *F02B 43/00* (2013.01); *F02B 63/04* (2013.01);
(Continued)

(58) Field of Classification Search
CPC .. F02D 19/0647; F02D 19/0613; F02D 29/06; F02D 41/0025; F02D 11/02;
(Continued)

(56) References Cited

U.S. PATENT DOCUMENTS 2,722,208 A 11/1955 Conroy, Jr. et al.
3,384,059 A 5/1968 Copa
(Continued)

FOREIGN PATENT DOCUMENTS

CN 2060477 U 8/1990
CN 1981121 A 6/2007

OTHER PUBLICATIONS

Honda EU20i LPG, Mar. 20, 2012, https://www.youtube.com/watch?v=yBpq33aJmR0.
(Continued)

*Primary Examiner* — Long T Tran
(74) *Attorney, Agent, or Firm* — Ziolkowski Patent Solutions Group, SC

(57) ABSTRACT

A dual fuel engine includes an engine operable on a gaseous fuel and a liquid fuel and a switch to change operation of the engine between gaseous fuel and liquid fuel. The dual fuel engine also includes a carburetor attached to an intake of the engine to mix air and fuel and connect to a gaseous fuel source and a liquid fuel source. A liquid fuel cut-off attaches to the carburetor to interrupt liquid fuel upon actuation of the switch from liquid fuel to gaseous fuel.

64 Claims, 12 Drawing Sheets

(51) Int. Cl.
*F02B 43/00* (2006.01)
*F02D 19/06* (2006.01)
*F02M 43/00* (2006.01)
*F02M 17/10* (2006.01)
*F02M 21/02* (2006.01)
*F02B 63/04* (2006.01)
*F02D 41/06* (2006.01)
*F02M 21/04* (2006.01)
*F02D 41/00* (2006.01)
*F02M 19/08* (2006.01)
*F02N 3/02* (2006.01)

(52) U.S. Cl.
CPC ......... *F02D 19/0613* (2013.01); *F02M 13/08* (2013.01); *F02M 17/10* (2013.01); *F02M 21/0212* (2013.01); *F02M 43/00* (2013.01); *F02D 41/0025* (2013.01); *F02D 41/062* (2013.01); *F02M 19/08* (2013.01); *F02M 21/047* (2013.01); *F02N 3/02* (2013.01); *Y02T 10/32* (2013.01); *Y02T 10/36* (2013.01)

(58) Field of Classification Search
CPC .. F02D 19/0642; F02D 35/0053; F02B 63/04; F02B 43/00; F02B 63/044; F02M 13/08; F02M 19/08; F02M 21/047; F02N 3/02
See application file for complete search history.

(56) References Cited

U.S. PATENT DOCUMENTS

| | | | |
|---|---|---|---|
| 3,412,258 A * | 11/1968 | Satter | H02P 9/42 290/40 R |
| 3,659,574 A * | 5/1972 | Reschke | F02M 13/08 123/525 |
| 3,718,000 A * | 2/1973 | Walker | F02B 11/02 60/285 |
| 3,783,849 A * | 1/1974 | Bramfitt | F02M 13/06 123/576 |
| 3,888,223 A | 6/1975 | Mondt | |
| 4,335,697 A | 6/1982 | McLean | |
| 4,372,276 A | 2/1983 | Bernhardsson et al. | |
| 4,373,493 A | 2/1983 | Nelsh | |
| 4,393,848 A * | 7/1983 | Poehlman | F02B 69/04 123/525 |
| 4,450,821 A | 5/1984 | Venning et al. | |
| 4,463,735 A | 8/1984 | Stoltman | |
| 4,480,595 A | 11/1984 | Hobby et al. | |
| 4,489,699 A * | 12/1984 | Poehlman | F02B 69/04 123/525 |
| 4,502,453 A | 3/1985 | Kabasin et al. | |
| 4,619,240 A | 10/1986 | Bedford et al. | |
| 4,628,871 A | 12/1986 | Glass | |
| 4,708,094 A | 11/1987 | Helmich et al. | |
| 4,895,124 A | 1/1990 | Bartholomew | |
| 4,979,480 A | 12/1990 | Daikoku et al. | |
| 5,092,305 A | 3/1992 | King | |
| 5,161,496 A | 11/1992 | Matsushima et al. | |
| 5,171,487 A | 12/1992 | Hudz | |
| 5,228,423 A | 7/1993 | Oikawa et al. | |
| 5,287,839 A | 2/1994 | Kondou et al. | |
| 5,320,078 A | 6/1994 | Lorraine | |
| 5,325,835 A | 7/1994 | Kimata et al. | |
| 5,379,740 A | 1/1995 | Moore et al. | |
| 5,419,291 A | 5/1995 | Kimata et al. | |
| 5,438,968 A | 8/1995 | Johnson et al. | |
| 5,450,832 A | 9/1995 | Graf | |
| 5,611,312 A * | 3/1997 | Swanson | F02M 1/02 123/179.18 |
| 5,673,670 A | 10/1997 | Powell et al. | |
| 5,809,979 A * | 9/1998 | Tsuda | F02M 13/08 123/525 |
| 5,816,224 A | 10/1998 | Welsh et al. | |
| 6,082,323 A | 7/2000 | Winberg | |
| 6,213,083 B1 | 4/2001 | Winberg | |
| 6,223,730 B1 | 5/2001 | Hasegawa et al. | |
| 6,276,345 B1 | 8/2001 | Nelson et al. | |
| 6,401,685 B1 | 6/2002 | Warner | |
| 6,453,877 B1 | 9/2002 | Lucier et al. | |
| 6,591,817 B2 * | 7/2003 | Deutsch | F02D 19/0647 123/525 |
| 6,914,342 B1 | 7/2005 | French | |
| 7,905,469 B2 | 3/2011 | Nickels et al. | |
| 8,342,158 B2 | 1/2013 | Ulrey et al. | |
| 8,590,510 B2 | 11/2013 | Surnilla et al. | |
| 9,435,273 B2 | 9/2016 | Sarder et al. | |
| 2002/0134362 A1 * | 9/2002 | Deutsch | F02D 19/0647 123/575 |
| 2004/0139943 A1 | 7/2004 | Kern et al. | |
| 2007/0137591 A1 * | 6/2007 | Sugimoto | F02B 63/04 123/41.7 |
| 2010/0258099 A1 * | 10/2010 | Andersson | F02D 31/006 123/676 |
| 2011/0168133 A1 | 7/2011 | Pursifull et al. | |
| 2011/0253102 A1 * | 10/2011 | Watanabe | F02D 41/064 123/438 |
| 2013/0047964 A1 | 2/2013 | Kim | |
| 2013/0220274 A1 | 8/2013 | Deshpande et al. | |
| 2014/0202430 A1 | 7/2014 | Monros | |
| 2014/0238340 A1 | 8/2014 | Dunn et al. | |
| 2014/0373531 A1 | 12/2014 | Wong | |
| 2015/0122230 A1 * | 5/2015 | Sarder | F02D 19/0613 123/525 |

OTHER PUBLICATIONS

Johnson et al., "Electronic Direct Fuel Injection (EDFI) for Small Two-Stroke Engines," SAE Technical Paper 1999-01-3312, Proceedings of the 1999 SAE Small Engine Technology Conference, Madison, WI, Sep. 28-30, 1999, pp. 1-15.

Champion Power (Dec. & Jan. 2014) 100153 Manual, Retrieved from http://www.championpowerequipment.com/media/2400/100153_manual-english_12-4-14.pdf.

* cited by examiner

BATTERYLESS DUAL FUEL ENGINE WITH LIQUID FUEL CUT-OFF

CROSS-REFERENCE TO RELATED APPLICATION

The present application is a continuation-in-part of, and claims priority to, U.S. patent application Ser. No. 14/738,060, filed Jun. 12, 2015, the disclosure of which is incorporated herein by reference in its entirety.

BACKGROUND OF THE INVENTION

Embodiments of the invention relate generally to dual fuel generators, and more particularly, to an apparatus and method for delivering liquid fuel or gaseous fuel to a dual fuel generator.

Electric generators are frequently driven by internal combustion engines that use gasoline as a fuel source. Gasoline is a common fuel source for generators in a variety of applications. However, alternative fuel sources also provide a desirable fuel source. For instance, alternative fuels may provide a clean burning fuel that limits hazardous emissions. Alternative fuels may also be stored for long periods of time without degradation, whereas gasoline can degrade over a period of months leading to hard starting, rough running, and also lead to gum and varnish deposit left in the fuel system. In addition, generators that operate on alternative fuels may generate electricity when gasoline is not readily available. For instance, generators are frequently used when power outages in the utility grid result from severe weather. Unfortunately, gas stations may also be closed as a result of the power outage. Such a circumstance presents just one example where it would be advantageous to operate electrical generators on alternative fuels.

Certain generators are configured to operate as "dual fuel" generators, otherwise known as bi-fuel generators. These generators are driven by an internal combustion engine that is configured to operate on a liquid fuel for a period of operation and an alternative fuel for another period of operation. The alternative fuel source is generally a gaseous fuel that may exist in a gaseous state at normal temperature and pressure and can be any one of liquefied petroleum gas, compressed natural gas, hydrogen, or the like. Liquefied petroleum gas (LPG), often referred to as propane, exists in a gaseous state at normal temperature and pressure but can be conveniently stored under pressure in a liquid state. LPG may be a desirable fuel source for internal combustion engines because it can be stored for longer periods of time and contains fewer impurities than gasoline, resulting in smoother and cleaner operation, and often resulting in a longer lasting engine.

In order to provide the liquid and gaseous fuel to the engine, the dual fuel engine may have a first fuel line for liquid fuel and a second fuel line for gaseous fuel. A liquid fuel source and a gaseous fuel source may be coupled to the respective lines to provide fuel to the engine. However, a common problem with such configurations that couple two fuel sources to a single engine is the engine can experience overly rich air-fuel ratio when both fuels are simultaneously engaged during cross-over switching between the fuel sources. Such simultaneous delivery of fuel from the first fuel line and the second fuel line may make the engine hard to start or lead to unstable operating conditions. Further, a float bowl in the carburetor that must first fill or empty prior to changeover causes delay in cross-over switching between the fuel sources.

Therefore, it would be desirable to design a dual fuel generator having a liquid fuel and gaseous fuel delivery system that overcomes the aforementioned detriments without substantially increasing the overall cost of the system.

BRIEF DESCRIPTION OF THE INVENTION

In accordance with one aspect of the invention, a dual fuel engine includes an engine operable on a gaseous fuel and a liquid fuel. A carburetor attaches to an intake of the engine to mix air and fuel and connect to a gaseous fuel source and a liquid fuel source. The dual fuel engine also includes a switch to change operation of the engine between gaseous fuel and liquid fuel, and a liquid fuel cut-off attaches to the carburetor to interrupt liquid fuel upon actuation of the switch from liquid fuel to gaseous fuel.

In accordance with another aspect of the invention, a batteryless dual fuel generator includes a housing containing a pull start engine coupled to drive an alternator. The engine is operable on a gaseous fuel and a liquid fuel and includes a carburetor attached to an intake of the engine. The carburetor has a throat to mix fuel with air, a float bowl, and a fuel passage to provide liquid fuel from the float bowl to the throat. The generator may also include a switch to select engine operation on either the liquid fuel or the gaseous fuel and a fuel shutoff attached to the carburetor to close the fuel passage upon selection of engine operation to gaseous fuel.

In accordance with yet another aspect of the invention, a carburetor having a fuel shutoff includes a carburetor with a float bowl, a throat, and a fuel passage to provide fuel from the float bowl to the throat. A fuel shutoff couples to the carburetor which may have a first end in the carburetor that actuates to close the fuel passage and a second end external to the carburetor to actuate the first end. The fuel shutoff may operate within the carburetor such that the fuel shutoff actuates free from linear motion when opening and closing the fuel passage.

In accordance with yet another aspect of the invention, a method of assembling a dual fuel engine includes providing an engine operable on a gaseous fuel and a liquid fuel and attaching a carburetor to an intake of the engine to supply the fuels to the engine. The carburetor includes a throat to mix gaseous fuel with air and liquid fuel with air, a float bowl, and a fuel passage to provide liquid fuel from the float bowl to the throat. The fuels may be supplied to the carburetor by a gaseous fuel source coupled to the throat and a liquid fuel source coupled to the float bowl. The method also includes coupling a switch to the engine to change operation of the engine between gaseous fuel and liquid fuel, and attaching a liquid fuel cut-off to the carburetor to close the fuel passage upon actuation of the switch from liquid fuel to gaseous fuel.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

The operating environment of the invention is described with respect to a dual fuel generator. However, it will be appreciated by those skilled in the art that the invention is equally applicable for use with any dual fuel internal combustion engine. Moreover, the invention will be described with respect to a dual fuel generator configured to operate on a liquid fuel and a gaseous fuel. However, one skilled in the art will further appreciate that the invention is equally applicable for use with other fuel combinations for dual fuel generators and internal combustion engines.

Figure 1:
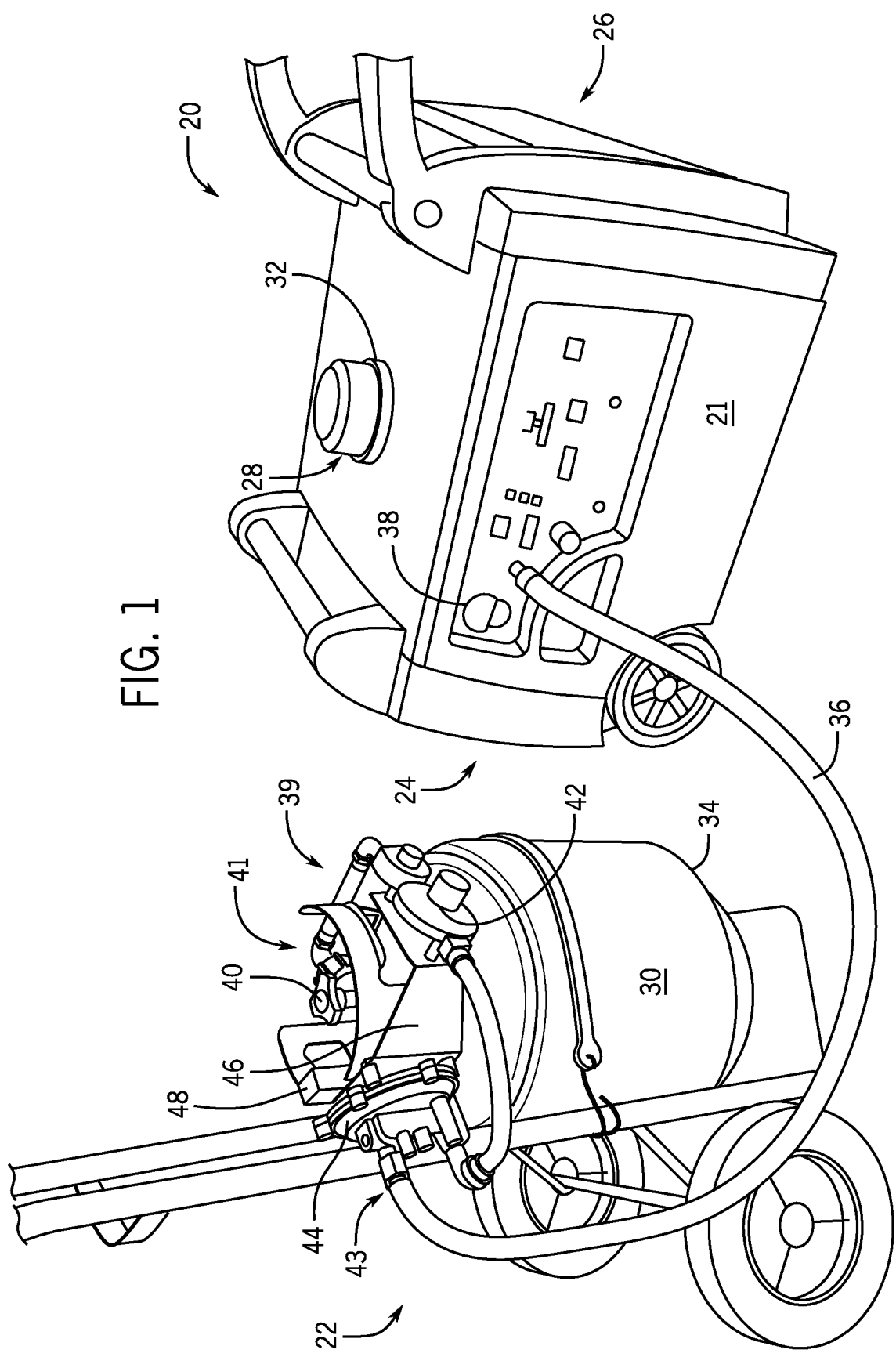
FIG. 1 is a perspective view of a dual fuel generator coupled to a fuel delivery system, according to an embodiment of the invention.

Referring to FIG. 1, a dual fuel generator 20 is coupled to a fuel delivery system 22, in accordance with an embodiment of the invention. Dual fuel generator 20 includes an internal combustion engine (not shown) within housing 21 at one end 24, operatively connected to an alternator also enclosed in housing 21 at another end 26, by conventional means. Dual fuel generator 20 is configured to operate on different fuels via either a first fuel source 28 or a second fuel source 30. In an exemplary embodiment of the invention, first fuel source 28 is a liquid fuel and second fuel source 30 is a gaseous fuel. The liquid fuel may be gasoline and the gaseous fuel may be liquid petroleum gas (LPG). Each can selectively operate the generator as desired and controlled by an operator. For instance, generator 20 may operate on gasoline for a first period of operation and then switch to LPG for a second period of operation. However, it is contemplated that dual fuel generator 20 is configured to operate on fuels other than gasoline and LPG (e.g., natural gas, biodiesel, etc.), and thus the scope of the invention is not meant to be limited strictly to a dual fuel arrangement where first fuel source 28 provides gasoline and second fuel source 30 provides LPG.

Figure 2:
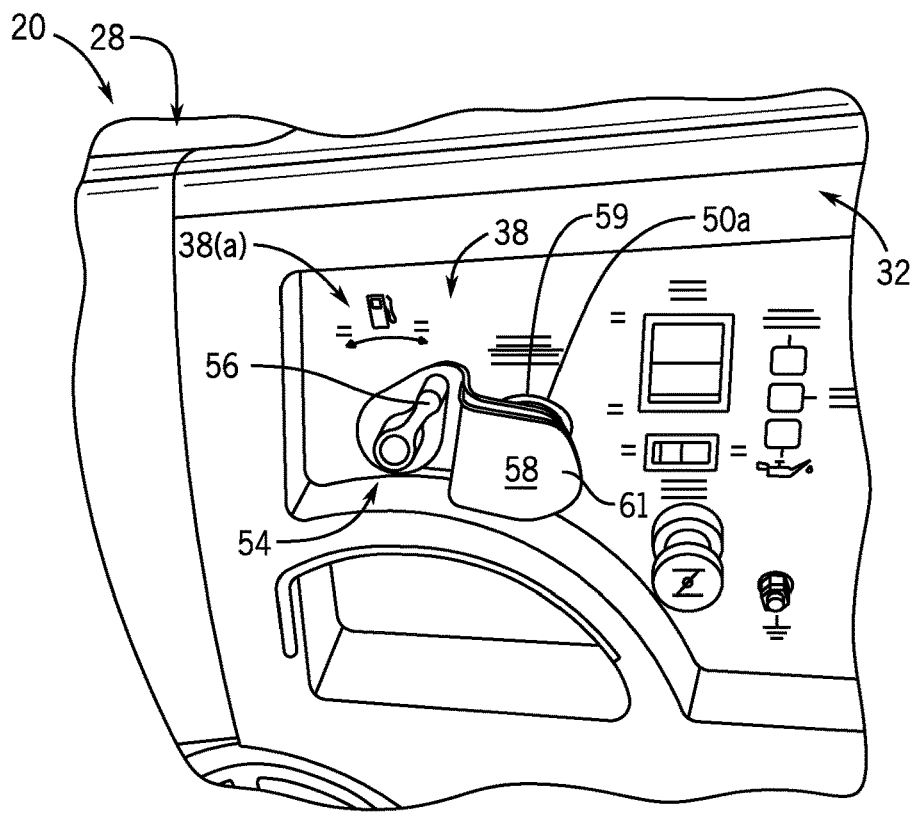
FIG. 2 is a detail view of a portion of the generator of FIG. 1 about a mechanical fuel lockout switch with the switch in a first position, according to an embodiment of the invention.
Figure 3:
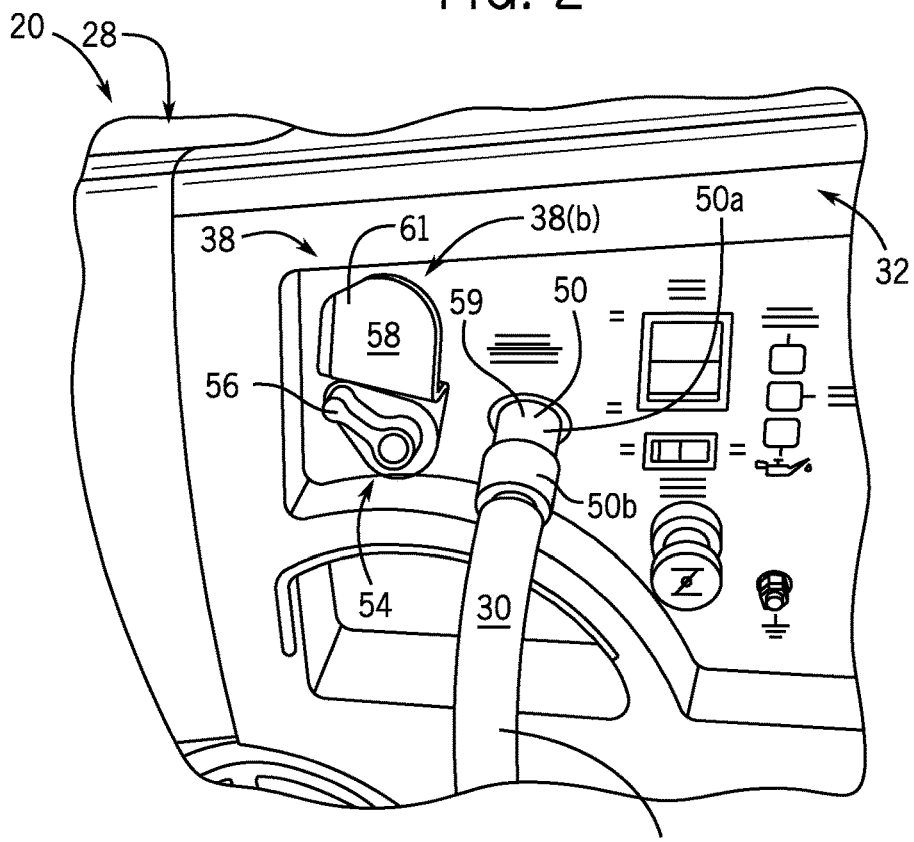
FIG. 3 is a detail view similar to FIG. 2 and showing the mechanical fuel lockout switch in a second position, with an LPG supply line connected thereto, according to an embodiment of the invention.

In one embodiment of the invention, dual fuel generator 20 includes a gasoline tank 32 or, generally, a liquid fuel tank, located inside cover 21 onboard generator 20 to provide gasoline to the engine as first fuel source 28. Gasoline tank 32 connects to a first fuel line to provide gasoline to the carburetor to run the engine, as will later be described with reference to FIGS. 4A and 4B. Generator 20 is also coupled to a pressurized fuel container 34, or a pressurized fuel source, located off board generator 20 to provide LPG to the engine as second fuel source 30. Pressurized fuel container 34 is coupled to generator 20 with an LPG supply hose 36. LPG supply hose 36 is coupled to a second fuel line within generator 20 to provide LPG to the carburetor to run the engine. Dual fuel generator 20 includes a mechanical fuel lockout switch 38 for selecting a desired fuel to be provided to the engine. The mechanical fuel lockout switch 38 is actuated to select first fuel source 28 when in a first position, as shown in FIG. 2, and alternately to select second fuel source 30 when in a second position, as shown in FIG. 3.

Referring back to FIG. 1, in an exemplary embodiment, fuel 30 from pressurized fuel container 34 is regulated using a fuel regulator system 39 for delivery to the engine. Fuel regulator system 39 includes one or more pressure regulators that reduce and control the pressure of the fuel from pressurized fuel container 34 and delivers fuel at a desired pressure for operation of the engine. Fuel regulator system 39 has an inlet 41 operatively coupled to a service valve 40 of pressurized fuel container 34 and an outlet 43 coupled to LPG supply hose 36. Fuel regulator system 39 includes a primary pressure regulator 42 coupled to pressurized fuel container 34 and a secondary pressure regulator 44. Primary pressure regulator 42 protects downstream components from high pressure of pressurized fuel container 34. Primary pressure regulator 42 receives LPG through service valve 40 of pressurized fuel container 34 and reduces the pressure of the LPG to a first stage. In one embodiment of the invention, the first stage may be delivered directly to generator 20 at a pressure required for operation of the engine.

In an exemplary embodiment of the invention, fuel regulator system 39 includes secondary pressure regulator 44 coupled to the outlet of primary pressure regulator 42 in order to use standard "off-the-shelf" components. Typically, the primary pressure regulator is mounted on the LPG tank, while the secondary pressure regulator is mounted on the component using the fuel, such as an engine or grill. Here, since generator 20 can be used as a gasoline only generator, secondary pressure regulator 44 is mounted off-board the generator to reduce size and cost of the generator. Secondary pressure regulator 44 receives LPG from primary pressure regulator 42 and further reduces the pressure of LPG to a second stage to be delivered to generator 20. In a system with two regulators, primary pressure regulator 42 regulates fuel received from pressurized fuel container 34 and reduces the pressure of the fuel to a level required for operation of secondary pressure regulator 44. Secondary pressure regulator 44 regulates fuel received from primary pressure regulator 42 and further reduces the pressure of the fuel to a level required for operation of generator 20. In addition, primary pressure regulator 42 may compensate for varying tank pressure as fuel is depleted while secondary pressure regulator 44 may compensate for varying demand from generator 20.

In accordance with an exemplary embodiment of the invention, fuel regulator system 39 includes both the primary and secondary regulators, or a custom single regulator, but in any case is located remotely, or off-board, from dual fuel generator 20. Fuel regulator system 39 may be directly mounted to pressurized fuel container 34 using a regulator mounting bracket 46. Regulator mounting bracket 46 has mounting locations for primary pressure regulator 42 and secondary pressure regulator 44. Regulator mounting bracket 46 also has a securing mechanism 48 to secure regulator mounting bracket 46 to pressurized fuel container 34.

In another embodiment of the invention, primary pressure regulator 42 is mounted on regulator mounting bracket 46 while secondary pressure regulator 44 could be mounted on or near generator 20. In yet another embodiment of the invention, a dual stage regulator may regulate the fuel received from pressurized fuel container 34 and deliver fuel at a pressure required for operation of generator 20. Such a dual stage regulator may regulate the fuel to the second stage within a single structure. The dual stage regulator may be mounted directly on fuel container 34.

Referring to FIG. 2, a detail view of a portion of generator 20 of FIG. 1 depicts mechanical fuel lockout switch 38 in a first position 38(a), in accordance with an embodiment of the invention. In this position, mechanical fuel lockout switch 38 provides gasoline flow from gasoline tank 32 to the engine while preventing connection of an LPG supply line to fuel inlet 59 of the second fuel line, as will later be discussed in detail with reference to FIGS. 4A and 4B. Still referring to FIG. 2, mechanical fuel lockout switch 38 provides a combination liquid fuel shutoff valve and a gaseous fuel supply lockout that prevents simultaneous delivery of fuel to the engine from gasoline tank 32 and pressurized fuel container 34, FIG. 1. As such, mechanical fuel lockout switch 38 provides a fuel selector to ensure only the selected fuel is provided to dual fuel generator 20.

Mechanical fuel lockout switch 38, FIG. 2, includes mechanical fuel valve 54 actuateable between first position 38(a) as shown in FIG. 2 and second position 38(b) as shown in FIG. 3 to selectively control fuel flow to the dual fuel engine from first fuel source 28 through a first fuel line and second fuel source 30 through a second fuel line 36. Mechanical fuel lockout switch 38 may also include fuel lockout apparatus 58 coupled to mechanical fuel valve 54 to communicate fuel sources individually to generator 20. In one embodiment of the invention, fuel lockout apparatus 58 communicates first fuel source 28 to the engine by actuating mechanical fuel valve 54 to first position 38(a) to open the first fuel line as shown in FIG. 2, and communicates second fuel source 30 to the engine by actuating mechanical fuel valve 54 to second position 38(b) to open communication of the second fuel source 30 to the engine as shown in FIG. 3. Referring back to FIG. 2, when mechanical fuel valve 54 is in first position 38(a), fuel lockout apparatus 58 communicates first fuel source 28 to the dual fuel engine and prevents communication between the second fuel source and the dual fuel engine.

Figure 4A:
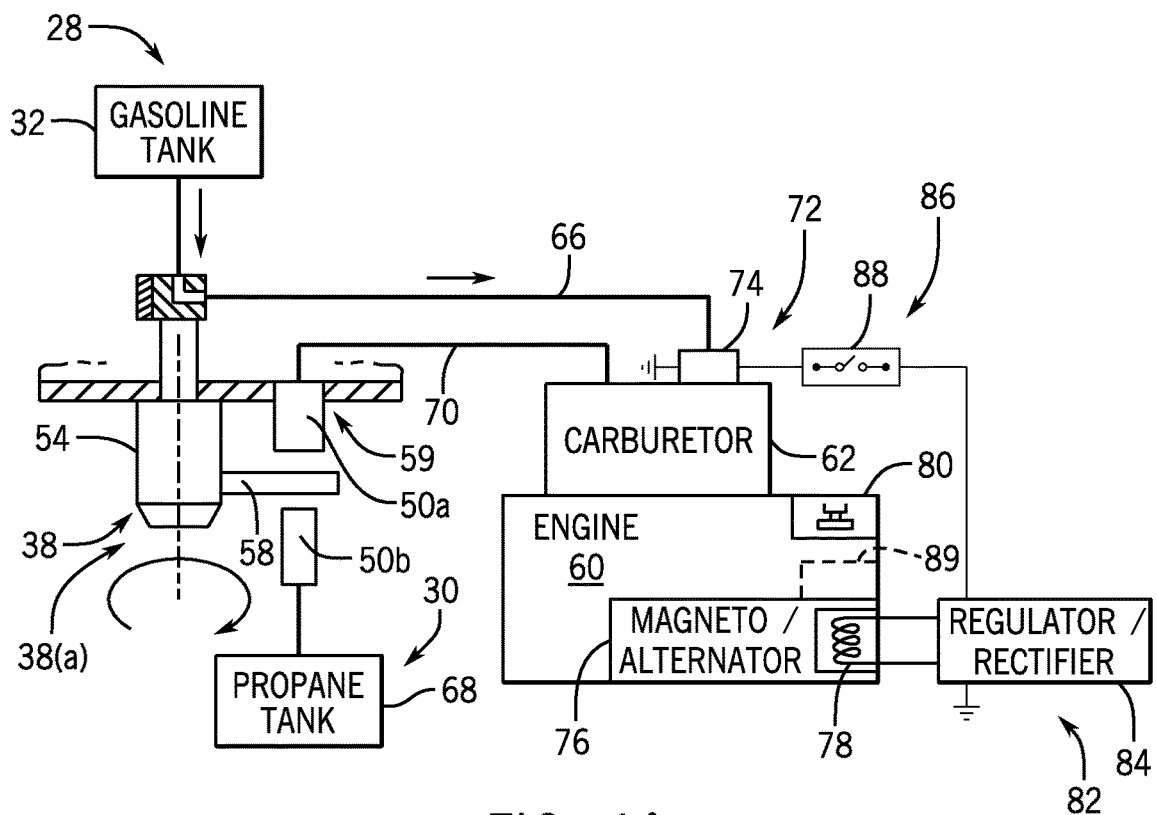
FIG. 4A is a schematic diagram of a fuel system for the dual fuel generator of FIG. 1 showing a liquid fuel source in communication with a carburetor of the generator consistent with the first position of the switch as shown in FIG. 2, according to an electro-mechanical embodiment of the invention.
Figure 4B:
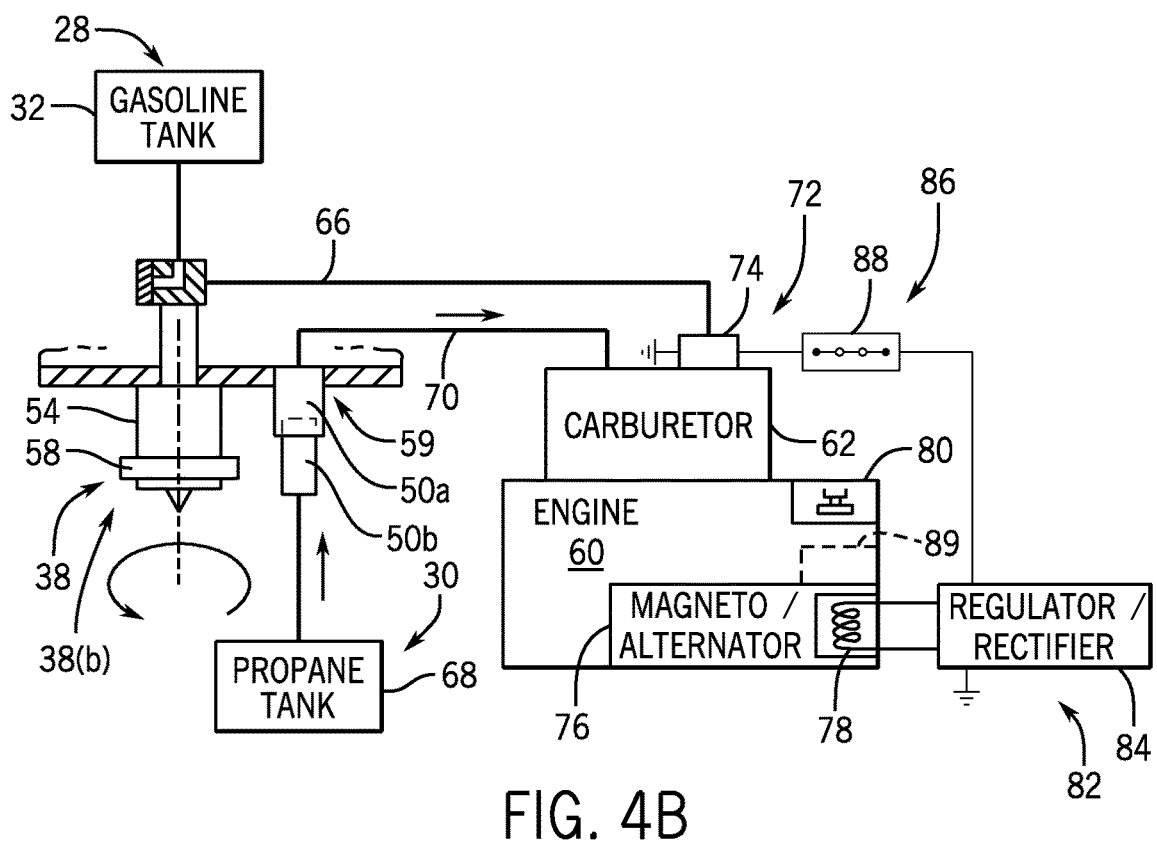
FIG. 4B is a schematic diagram of the fuel system of FIG. 4A showing a gaseous fuel source in communication with a carburetor of the generator of FIG. 1 consistent with the second position of the switch as shown in FIG. 3, according to an electro-mechanical embodiment of the invention.

In an exemplary embodiment of the invention, mechanical fuel valve 54 controls the flow of LPG to the engine by actuating fuel lockout apparatus 58 to block or unblock fuel inlet 59 for the second fuel source. Mechanical fuel valve 54 is coupled to the first fuel line as a liquid fuel valve, as shown in FIGS. 4A and 4B, and therefore can control the flow of gasoline to the engine by opening and closing the first fuel line. When the mechanical fuel valve 54, FIG. 2, is in the first position 38(a), gasoline flows from the gasoline tank to the engine and the fuel lockout apparatus 58 blocks the fuel inlet 59. Accordingly, fuel lockout apparatus 58 prevents LPG flow to generator 20 when the mechanical fuel valve 54 is in first position 38(a) wherein the engine is operated on gasoline.

Mechanical fuel valve 54 includes a fuel valve handle 56 to control the opening and closing of the valve. Fuel valve handle 56 is movable between first position 38(a) as shown in FIG. 2 and second position 38(b) as shown in FIG. 3. Mechanical fuel valve 54 opens the first fuel line (to enable liquid fuel flow to the engine) when fuel valve handle 56 is in the first position, and mechanical fuel valve 54 closes the first fuel line (to prevent liquid fuel flow to the engine) when fuel valve handle 56 is in the second position. Thus, when fuel valve handle 56 is in first position 38(a) as shown in FIG. 2, mechanical fuel valve 54 opens the first fuel line and allows gasoline from gasoline tank 32 to flow to the engine.

Fuel valve handle 56 is coupled to fuel lockout apparatus 58. Fuel valve handle 56 actuates with fuel lockout apparatus 58 to prevent LPG flow to generator 20 when gasoline flow to the generator is enabled. Fuel lockout apparatus 58 is controlled by fuel valve handle 56 so that moving fuel valve handle 56 to the first position causes fuel lockout apparatus 58 to block fuel inlet 59 for LPG, and moving fuel valve handle 56 to the second position causes fuel lockout apparatus 58 to unblock fuel inlet 59 for LPG.

In an exemplary embodiment of the invention, fuel valve handle 56 rotates between the first position and the second position and fuel lockout apparatus 58 is rigidly coupled to the rotating handle. Fuel lockout apparatus 58 may include a fuel inlet cover 61, which may be a flange, coupled to fuel valve handle 56 so that fuel inlet cover 61 rotates with the handle. Fuel inlet cover 61 extends radially outward from fuel valve handle 56 and sweeps over fuel inlet 59 for LPG as fuel valve handle 56 rotates. That is, fuel inlet cover 61 rotates transversely across fuel inlet 59 and blocks access thereto. Accordingly, fuel inlet cover 61 prevents LPG flow to generator 20 when fuel valve handle 56 is in first position 38(a) to allow gasoline to run the engine.

Referring to FIG. 3, a detail view of a portion of generator 20 of FIG. 1 depicts mechanical fuel lockout switch 38 in a second position 38(b), in accordance with an embodiment of the invention. In this position, mechanical fuel lockout switch 38 provides a disconnect to stop gasoline flow from gasoline tank 32 to the engine while allowing connection of LPG supply hose 36 to fuel inlet 59 of the second fuel line. FIG. 3 further shows LPG supply hose 36 coupling second fuel source 30 to generator 20 to deliver LPG to run the generator.

Mechanical fuel lockout switch 38 includes mechanical fuel valve 54 coupled to fuel lockout apparatus 58 to prevent gasoline flow to generator 20 when LPG from the LPG supply hose 36 is supplied to the engine. In one embodiment of the invention, actuation of mechanical fuel valve 54 to second position 38(b) causes fuel lockout apparatus 58 to allow communication of second fuel source 30 to the dual fuel engine, and interrupts the first fuel source 28 communication with the dual fuel engine. The position of fuel lockout apparatus 58 prevents the fuel valve handle 56 from moving to first position 38(a) (FIG. 2) while LPG supply hose 36 is connected to generator 20.

A quick-disconnect hose coupling 50, also referred to as a quick-connect hose coupling, connects LPG supply hose 36 to generator 20 so that LPG supply hose 36 may be quickly attached and detached from generator 20. Hose coupling 50 has a first end 50a mounted on the external surface of generator 20 and coupled to supply the second fuel to the engine. Hose coupling 50 has a second end 50b coupled to the outlet of LPG supply hose 36. Each end 50a, 50b has a gaseous fuel valve that opens when the couplings are engaged and closes when the couplings are disengaged. As such, quick-disconnect hose coupling 50 automatically opens when connected to enable fuel flow from LPG supply hose 36 to the engine. Hose coupling 50 automatically disconnects fluid communication when disconnected. Accordingly, when the supply hose is detached from generator 20, the coupling 50 is automatically closed so that fuel does not escape and unwanted air does not enter the fuel system.

In one embodiment, fuel inlet cover 61 is coupled to fuel valve handle 56 so that it is spaced apart from the surface of generator 20 to provide clearance for first end 50a of the quick-disconnect hose coupling 50 that protrudes from the surface of generator 20. As shown in FIG. 2, fuel inlet cover 61 blocks off first end 50a of the quick-disconnect hose coupling when fuel valve handle 56 is rotated to first position 38(a) to enable gasoline flow so that fuel inlet cover 61 prevents connection of LPG supply hose 36 (FIG. 3) to generator 20. As shown in FIG. 3, fuel inlet cover 61 uncovers first end 50a of the quick-disconnect hose coupling 50 when fuel valve handle 56 is rotated to second position 38(b) to disable gasoline flow so that fuel inlet cover 61 permits connection of LPG supply hose 36 to generator 20.

To operate generator 20 on LPG, fuel valve handle 56 is turned to second position 38(b) to disable the flow of gasoline to the engine and to expose first end 50a of hose coupling 50 on generator 20. LPG supply hose 36 is then connected to generator 20 via hose coupling 50 to enable the flow of LPG to the engine. To operate generator 20 on gasoline, LPG supply hose 36 is disconnected from generator 20 via hose coupling 50 to disable the flow of LPG to the engine and to unblock fuel valve handle 56 from rotating to the first position. As shown in FIG. 2, fuel valve handle 56 is then turned to first position 38(a) to enable the flow of gasoline to generator 20.

Referring to FIG. 4A, a schematic diagram of a fuel system for a dual fuel engine 60 shows mechanical fuel lockout switch 38 in first position 38(a) to provide communication between the first fuel source 28 and dual fuel carburetor 62, according to an embodiment of the invention. Mechanical fuel lockout switch 38 prevents communication between second fuel source 30 and dual fuel carburetor 62 when the switch is in first position 38(a). In one embodiment of the invention, first fuel source 28 includes a gasoline tank 32 to provide gasoline to carburetor 62 through a first fuel line 66, and second fuel source 30 can include a propane or LPG tank 68 to provide propane or LPG to carburetor 62 through a second fuel line 70. Accordingly, first fuel line 66 may be a liquid fuel line and second fuel line 70 may be a gaseous fuel line.

Mechanical fuel lockout switch 38 changes the fuel source for engine 60 between liquid fuel and gaseous fuel. Mechanical fuel lockout switch 38 includes a mechanical fuel valve 54 actuateable between first position 38(a) as shown in FIG. 4A and second position 38(b) as shown in FIG. 4B to selectively control fuel flow to the dual fuel engine 60 from first fuel source 28 through first fuel line 66 and second fuel source 30 through second fuel line 70. Referring back to FIG. 4A, mechanical fuel valve 54 selectively controls fuel flow through first fuel line 66 by opening the line when the mechanical fuel lockout switch 38 actuates to first position 38(a). Mechanical fuel valve 54 may be coupled to fuel lockout apparatus 58 that actuates with mechanical fuel valve 54 to block and unblock fuel inlet 59 of second fuel line 70. First end 50a of the quick-disconnect hose coupling is located at fuel inlet 59 and a mating end 50b of the quick-disconnect hose coupling is coupled to the propane or LPG tank 68. Actuation of mechanical fuel valve 54 to first position 38(a) causes fuel lockout apparatus 58 to block fuel inlet 59 to prevent coupling the first end 50a and second end 50b of the quick-disconnect hose coupling together, and actuation of mechanical fuel valve 54 to another position causes fuel lockout apparatus 58 to unblock fuel inlet 59 to permit attaching first end 50a and second end 50b together.

A liquid fuel cut-off 72 couples to carburetor 62 to regulate liquid fuel flow through the carburetor. Liquid fuel cut-off 72 can stop liquid fuel flow to engine 60 to prevent an overly rich air-fuel ratio when operating engine 60 on gaseous fuel. Liquid fuel cut-off 72 may attach to carburetor 62 to interrupt liquid fuel upon actuation of mechanical fuel lockout switch 38 from liquid fuel to gaseous fuel. As such, liquid fuel cut-off 72 can prevent engine flooding by stopping liquid fuel flow when starting on gaseous fuel. Liquid fuel cut-off 72 is manually operated in some embodiments of the invention and electrically operated in other embodiments of the invention.

In one embodiment of the invention, liquid fuel cut-off 72 comprises a fuel cut solenoid 74, also referred to as a carburetor cutoff solenoid, that operates within carburetor 62 as a solenoid valve to control liquid fuel flow to engine 60. Fuel cut solenoid 74 actuates between an open position to provide liquid fuel to engine 60 and a closed position to stop liquid fuel to the engine. Fuel cut solenoid 74 can operate as a normally open solenoid valve so that power is not required to open the solenoid during liquid fuel operation. As such, fuel cut solenoid 74 is powered and moved to a closed position to stop liquid fuel flow to engine 60 during gaseous fuel operation. Alternatively, fuel cut solenoid 74 may be operated as a normally closed valve that is powered to open for liquid fuel operation.

Fuel cut solenoid 74 is preferably powered by a magneto 76, alternator, engine flywheel with a charge winding, or other electrical power generator having a charge winding or coil 78. Charging coil 78 allows operation of fuel cut solenoid 74 in a batteryless engine. In a batteryless dual fuel generator, the charging coil 78 may be integral to an alternator driven by the batteryless engine. Engine 60 may be a pull-start engine having a recoil starter 80. During engine startup, recoil starter 80 cranks the engine with a manual pull by a user that causes magneto 76 to supply electrical power to fuel cut solenoid 74. While a fuel cut solenoid 74 in a normally open mode does not require any initial electrical power for starting engine 60 on liquid fuel, charging coil 78 powers the solenoid to stop liquid fuel flow during startup on gaseous fuel. Alternatively, charging coil 78 can power a fuel cut solenoid 74 operating in a normally closed mode to open and provide liquid fuel to engine 60 during startup on liquid fuel.

Charging coil 78 has an output voltage generally proportional to engine speed and therefore charge coil 78 will produce a range of voltages over the range of engine operating speeds. For example, if charging coil 78 produces 12 VAC at 3600 rpm, it may only produce 1 VAC at 300 rpm which would be insufficient voltage during startup to power a solenoid that requires 12 volts. An alternator typically used to power 12 volt accessories, such as a battery, at engine speeds will need increased output voltage to provide sufficient voltage for operation of fuel cut solenoid 74 at low recoil start speeds. In addition, the output voltage of a charging coil may vary if the alternator or magneto 76 also powers accessories. Accordingly, the output voltage of a charging coil should be verified by running engine 60 through the full range of operating speeds before increasing the output voltage.

Additional turns can be added to a charging coil in the alternator or magneto 76 to increase the output voltage and provide sufficient voltage to activate fuel cut solenoid 74 at manual start speeds. Typical alternators or magnetos may have limited room within stator laminations for additional turns, but low current requirements of fuel cut solenoid 74 allows substitution of smaller gage wire. Alternatively, solenoid windings on fuel cut solenoid 74 can be modified to operate at lower voltages for recoil starting. However, adding coil turns to a charge winding provides an inexpensive modification and allows use of standard 12 volt solenoids.

To protect electrical systems, a voltage regulator 82 couples to charging coil 78 to provide a fixed output voltage for a varying input voltage. If charge winding 78 is wound to supply 12 VAC at 300 rpm, it could supply 144 VAC at 3600 rpm. Applying 144 volts could quickly destroy a solenoid designed to operate at 12 volts. Accordingly, voltage regulator 82 may comprise a switching power supply circuit 84 that regulates a rectified DC power output from magneto 76 and provides a fixed voltage to fuel cut solenoid 74. Switching circuits are very efficient, dissipate very little power, and can be made small and inexpensive. Switching power supply circuit 84 allows for low rpm, recoil starter electrical power generation with charge coil 78 voltage control over engine speed range.

In the embodiment shown in FIGS. 4A and 4B, fuel cut solenoid 74 is operated by an electro-mechanical switch 86. Electro-mechanical switch 86 connects one fuel source to carburetor 62 and is connected to magneto 76 for a power source. Electro-mechanical switch 86 may comprise an electrical switch 88 that provides electrical connection between fuel cut solenoid 74 and magneto 76. Electro-mechanical switch 86 may also comprise mechanical fuel lockout switch 38, and electrical switch 88 can be mechanically actuated and controlled by mechanical fuel lockout switch 38. Fuel cut solenoid 74 connects to open and close a fuel path to pull-start engine 60 in response to reception of electrical power from electro-mechanical switch 86.

Fuel cut solenoid 74 can operate as a normally open valve that closes when powered by alternator or magneto 76. The normally open valve is activated to close and prevent gasoline flow to engine 60 for LPG mode, and deactivated to open and allow gasoline flow to engine 60 for gasoline mode. As such, actuation of mechanical fuel lockout switch 38 to first position 38(*a*) opens electrical switch 88 to interrupt power and open fuel cut solenoid 74 as represented in FIG. 4A, and actuation of mechanical fuel lockout switch 38 to second position 38(*b*) closes electrical switch 88 to power and close fuel cut solenoid 74 as represented in FIG. 4B. Alternatively, fuel cut solenoid 74 can operate as a normally closed valve where actuation of mechanical fuel lockout switch 38 to first position 38(*a*) closes electrical switch 88 to power and open fuel cut solenoid 74, and actuation of mechanical fuel lockout switch 38 to second position 38(*b*) opens electrical switch 88 to interrupt power and close fuel cut solenoid 74.

In an alternative embodiment of the invention, a microcontroller 89 operates fuel cut solenoid 74 so that fuel cut solenoid 74 opens to operate engine 60 on gasoline and is closed when the engine operates on LPG. While engine 60 is running, charging coil 78 provides power available to microcontroller 89 for operation of fuel cut solenoid 74. Fuel cut solenoid 74 may operate in a normally open mode to allow gasoline flow to engine 60 without power from microcontroller 89, and microcontroller 89 may operate fuel cut solenoid 74 to operate as an after-fire solenoid when shutting down engine 60 from gasoline operation. That is, microcontroller 89 powers fuel cut solenoid 74 to a closed position preventing fuel being drawn into engine 60 and muffler during engine shutdown from operation on gasoline. When engine 60 runs on LPG, microcontroller 89 switches on power to close fuel cut solenoid 74 to prevent engine 60 from drawing in gasoline from the float bowl of carburetor 62 and first fuel line 66. Microcontroller 89 may also operate fuel cut solenoid 74 configured to be normally closed. Implementation of microcontroller 89 is further described with respect to FIG. 14.

Referring to FIG. 4B, a schematic diagram of a fuel system for a dual fuel engine shows mechanical fuel lockout switch 38 in second position 38(*b*) to provide communication between second fuel source 30 and dual fuel carburetor 62, according to an embodiment of the invention. Mechanical fuel lockout switch 38 prevents communication between first fuel source 28 and dual fuel carburetor 62 when the switch is in second position 38(*b*). The dual fuel engine has a first fuel line 66 to provide fuel from first fuel source 28 to carburetor 62 and a second fuel line 70 to provide fuel from second fuel source 30 to carburetor 62.

Mechanical fuel lockout switch 38 includes mechanical fuel valve 54 that selectively controls fuel flow through first fuel line 66 by closing the line when mechanical fuel lockout switch 38 actuates to second position 38(*b*). Mechanical fuel lockout switch 38 may also include a mechanical lockout apparatus 58 to block and unblock fuel inlet 59 of the second fuel line 70. Fuel inlet 59 may include first end 50*a* of the quick-connect hose coupling mounted on the generator and coupled to second fuel line 70. Second end 50*b* of the quick-connect hose coupling is coupled to the outlet of second fuel source 30, and the first end 50*a* mates with second end 50*b* to quickly attach propane or LPG tank 68 to second fuel line 70. Fuel lockout apparatus 58 may also hold mechanical fuel lockout switch 38 in second position 38(*b*) when the propane or LPG tank 68 is coupled to the engine via the ends 50*a*, 50*b* of the quick-connect hose coupling.

Liquid fuel cut-off 72 couples to carburetor 62 to regulate liquid fuel flow through the carburetor as described with respect to FIG. 4A. Liquid fuel cut-off 72 may comprise a fuel cut solenoid 74 powered by magneto 76. Engine 60 has recoil starter 80 that cranks the engine and drives magneto 76 to power fuel cut solenoid 74 when starting the engine. Voltage regulator 82 reduces the voltage delivered to fuel cut solenoid 74 at higher engine operating speeds. Fuel cut solenoid 74 is activated by electro-mechanical switch 86 providing electrical connection to magneto 76 via electrical switch 88. Electrical switch 88 can be manually actuated and controlled by mechanical fuel lockout switch 38. FIG. 4B shows electrical switch 88 closed to power a normally open configured fuel cut solenoid 74 to a closed position for LPG mode when mechanical fuel lockout switch 38 is in second position 38(b).

FIG. 4A and FIG. 4B depict an embodiment where mechanical fuel valve 54 operates along first fuel line 66 to provide a flow path for first fuel source 28 to carburetor 62 when the valve is in first position 38(a). That is, mechanical fuel valve 54 may control a single fuel line that runs through the valve while operating fuel lockout apparatus 58 to control fuel flow through second fuel line 70. Embodiments of the invention also contemplate mechanical fuel valve 54 configured to operate along second fuel line 70 to provide a flow path for second fuel source 30 to carburetor 62 when the valve is in second position 38(b). Mechanical fuel valve 54 may be configured to control multiple fuel lines that run through the valve according to embodiments of the invention. In another embodiment of the invention, a manual fuel petcock is coupled along second fuel line 70 to provide an independent shut-off from second fuel source 30 to the engine.

Figure 5:
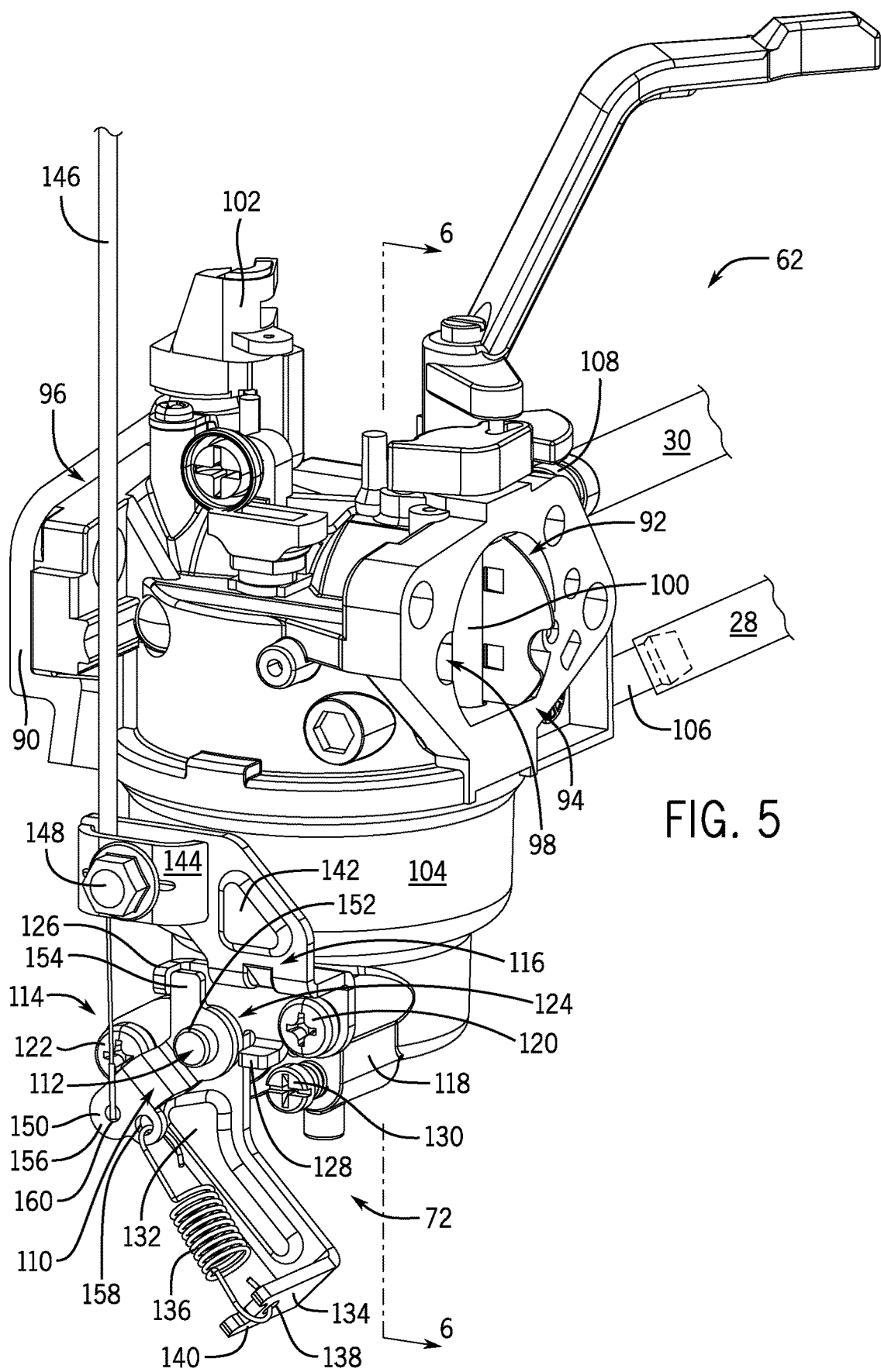
FIG. 5 is a perspective view of a dual fuel carburetor having a manual fuel shutoff system and coupled to a first fuel line and a second fuel line, according to a mechanical embodiment of the invention.

Referring to FIG. 5, a dual fuel carburetor having a manual fuel shutoff system is shown, in accordance with a mechanical embodiment of the invention. Carburetor 62 attaches to an intake 90 of the engine to mix air and fuel and connect to a liquid fuel source and a gaseous fuel source. Carburetor 62 has a mixing passage or throat 92 having an inlet 94 for air and an outlet 96 for an air-fuel mixture. A venturi 98 is located in throat 92 with a choke valve 100 located upstream from the venturi and a throttle valve 102 located downstream from the venturi. Carburetor 62 has a float bowl 104 that provides fuel through a fuel passage into a narrow portion of venturi 98. Float bowl 104 has a liquid fuel inlet 106 to receive liquid fuel from first fuel source 28. Throat 92 has a gaseous fuel inlet 108 to receive gaseous fuel from second fuel source 30. Dual fuel carburetor 62 mixes air with fuel from first fuel source 28 and second fuel source 30 and provides the respective air-fuel mixtures for operation of the dual fuel generator.

Liquid fuel cut-off 72 couples to carburetor 62 to control liquid fuel flow downstream of float bowl 104 in the carburetor. Liquid fuel cut-off 72 can close off float bowl 104 to stop liquid fuel flow to the engine and prevent an overly rich air-fuel ratio during gaseous fuel operation. As such, liquid fuel cut-off 72 prevents engine flooding when starting on gaseous fuel. Liquid fuel cut-off 72 also traps fuel in float bowl 104 to eliminate delay in filling the bowl when starting the engine on liquid fuel, and can stop liquid fuel flow to the engine immediately after ignition shutdown. As such, liquid fuel cut-off 72 reduces emissions and prevents afterfire by stopping the engine from continuing to draw in fuel from float bowl 104 during shutdown.

Figures 7A, 7B:
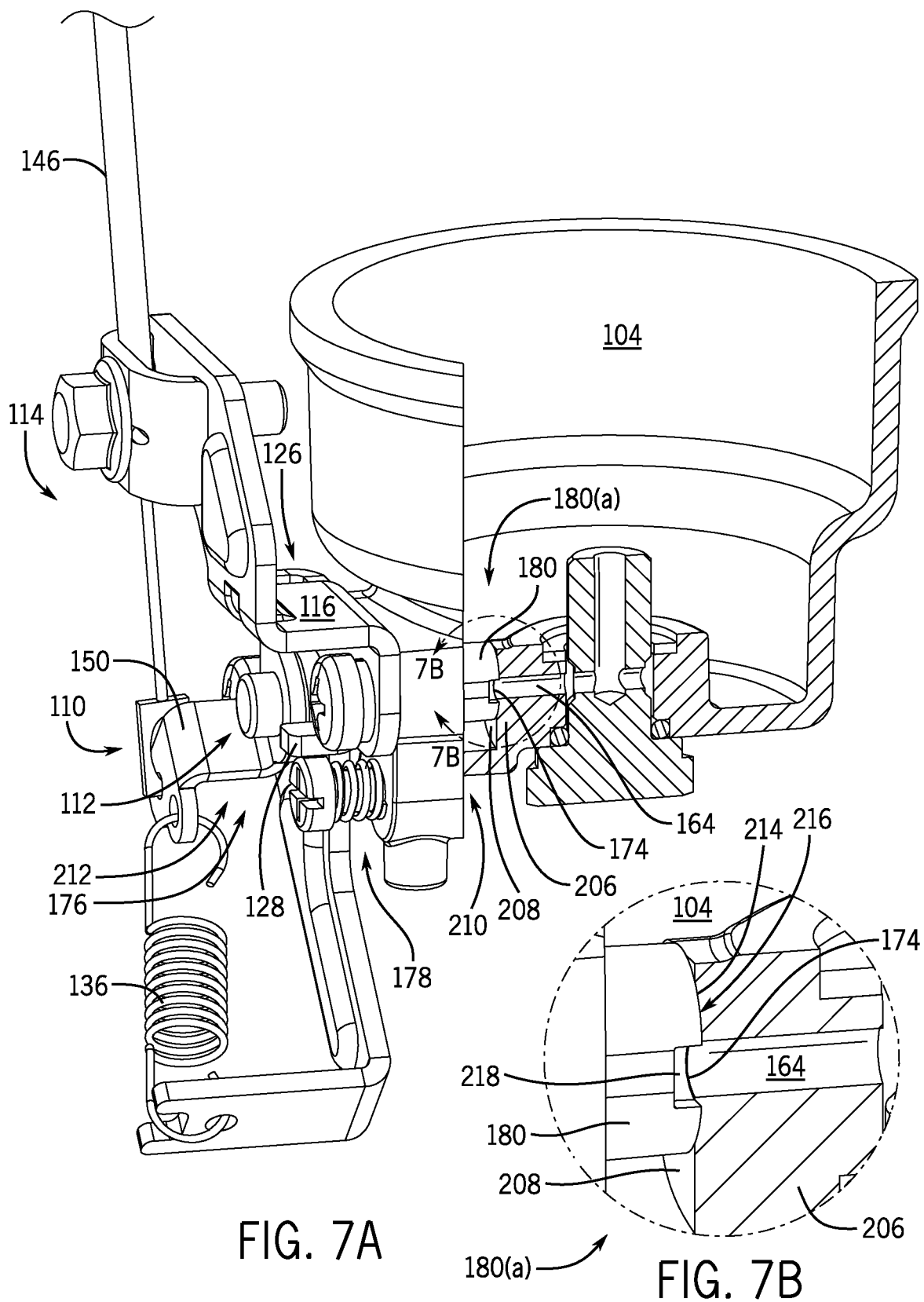
FIG. 7A is a partial sectional view of the float bowl of FIG. 6 with a manual fuel shutoff system in an open position, according to an embodiment of the invention.
FIG. 7B is a detailed partial sectional view of the float bowl with a manual fuel shutoff of FIG. 7A taken along line 7B-7B of FIG. 7A, according to an embodiment of the invention.
Figure 8:
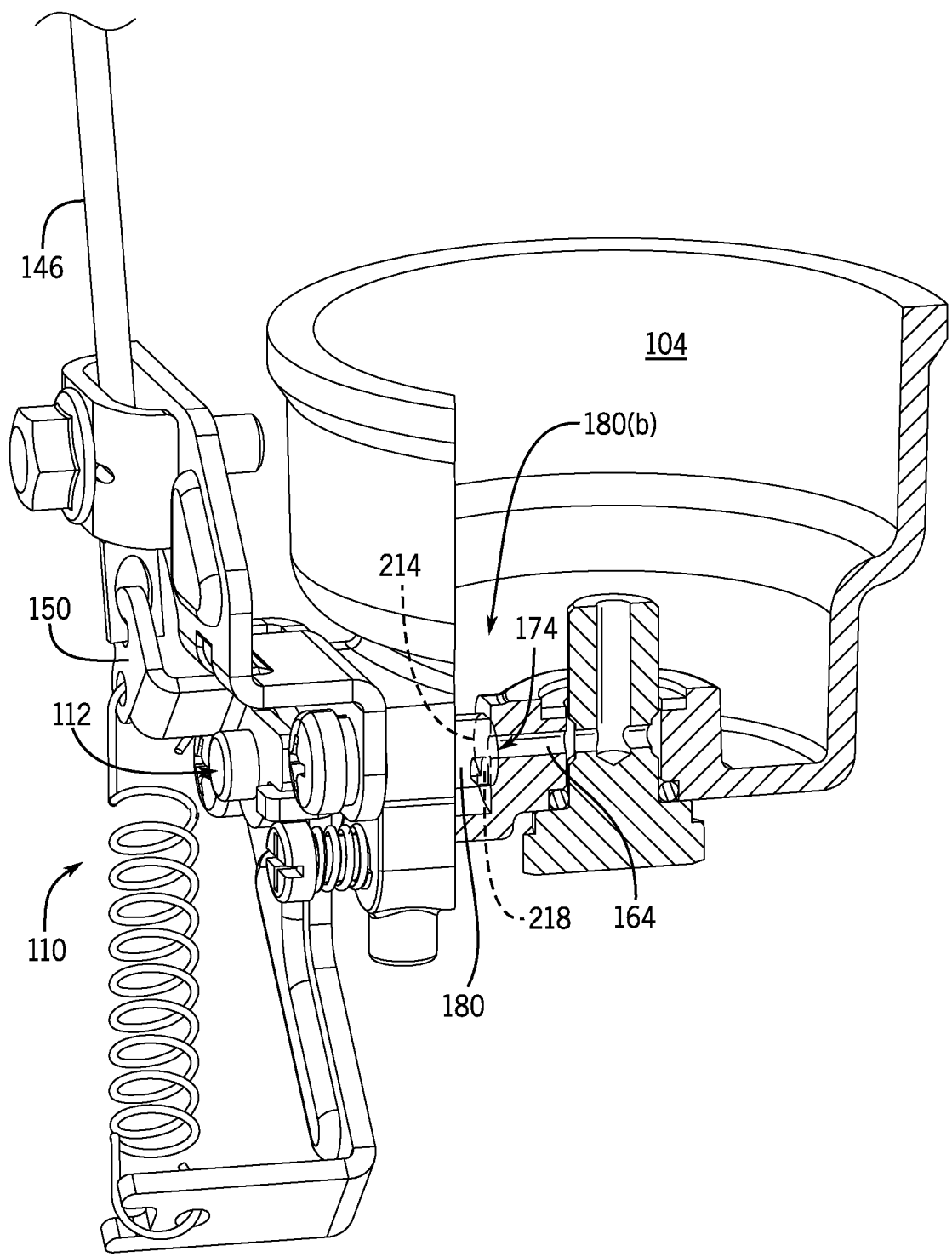
FIG. 8 is a partial sectional view similar to FIG. 7A and showing the manual fuel shutoff system in a closed position, according to an embodiment of the invention.

In the embodiment of FIG. 5, liquid fuel cut-off 72 comprises a manually operated fuel shutoff 110 coupled to carburetor 62 to control liquid fuel flow downstream of float bowl 104. Manual fuel shutoff 110 can be cable actuated for use on engines without battery power, for instance engines with recoil starters. Manual fuel shutoff 110 actuates between a first position to allow gasoline flow to the engine, as shown in FIG. 7A, and a second position to prevent gasoline flow to the engine, as shown in FIG. 8. Referring back to FIG. 5, manual fuel shutoff 110 may comprise a shaft 112 extending into carburetor 62 that actuates between the first position and second position. A manually operated control system 114 couples to shaft 112 external to carburetor 62 to control manual fuel shutoff 110.

A bracket 116 couples to the outer surface of carburetor 62 to support manual control system 114. Bracket 116 mounts to a boss 118 extending outwards from float bowl 104. Boss 118 has a flat vertical surface with a pair of tapped holes for mounting bracket 116 to float bowl 104. Screws 120, 122 extend through respective holes in bracket 116 and into the tapped holes to mount the bracket to carburetor 62. Manual fuel shutoff 110 extends out of carburetor 62 and through an opening 124 in bracket 116. Bracket 116 has a first stopping tab 126 and a second stopping tab 128 extending away from float bowl 104 to hold manual fuel shutoff 110 in a respective open or closed position. A fuel drain screw 130 extends into an opening in carburetor 62 adjacent bracket 116.

Bracket 116 has a lower arm 132 extending downward and to the air inlet side of carburetor 62. Lower arm 132 has a bottom portion 134 bent outward from carburetor 62 to couple to a control system spring 136. Bottom portion 134 has a hole 138 for control system spring 136 adjacent a positioning groove 140 for the spring. Control system spring 136 is held in position by groove 140 as it hooks through hole 138. Bracket 116 also has an upper arm 142 extending first outward from carburetor 62 and then vertically and to the outlet side of the carburetor. Upper arm 142 has a cable clamp 144 for holding a Bowden cable 146. Cable clamp 144 has a flat midsection and two curved ends contacting bracket 116 to hold the midsection slightly apart from the bracket. Cable clamp 144 is coupled to bracket 116 by a bolt 148 extending through a hole in the midsection and through upper arm 142 of the bracket.

A lever 150 couples to shaft 112 to actuate manual fuel shutoff 110. A cap 152 holds lever 150 on shaft 112. Alternatively, lever 150 may be coupled to the shaft 112 by welding or staking. Lever 150 has a first lever arm 154 to contact and hold lever 150 against first and second stopping tabs 126, 128 of the bracket. Lever 150 has a second lever arm 156 to actuate shaft 112. First lever arm 154 is in plane with an opening in the lever for shaft 112 and second lever arm 156 extends first outward from carburetor 62 and then parallel to first lever arm 154. Second lever arm 156 extends outward from carburetor 62 to provide clearance between bracket 116 and the second lever arm for control system spring 136 and screw 122. Second lever arm 156 has two holes 158, 160 for coupling control system spring 136 and Bowden cable 146 to lever 150.

Manual fuel shutoff 110 operates as a valve within carburetor 62 to selectively interrupt liquid fuel flow to the engine. Control system spring 136 preferably pulls on lever 150 to hold manual fuel shutoff 110 in an open valve position, and Bowden cable 146 pulls lever 150 against control system spring 136 to rotate manual fuel shutoff 110 to a closed valve position. As such, control system spring 136 holds manual fuel shutoff 110 open for gasoline mode until Bowden cable 146 is pulled to close the valve for LPG mode. Alternatively, control system spring 136 can hold manual fuel shutoff 110 in a closed valve position until Bowden cable 146 is pulled to open the valve. Therefore, actuation of the Bowden cable 146 acts as a switch to assist in changeover between the dual fuels. Manual fuel shutoff 110 may rotate 90 degrees between the open and closed positions with stopping tabs 126, 128 positioned about bracket 116 accordingly. Lever 150 can be positioned on shaft 112 so that second lever arm 156 is pulled upward by a generally vertical Bowden cable 146. Second lever arm 156 may actuate between a position 45 degrees below horizontal for an open valve and a position 45 degrees above horizontal for a closed valve. When holding the valve open, control system spring 136 may be oriented at a right angle to second lever arm 156 for increased leverage.

Figure 6:
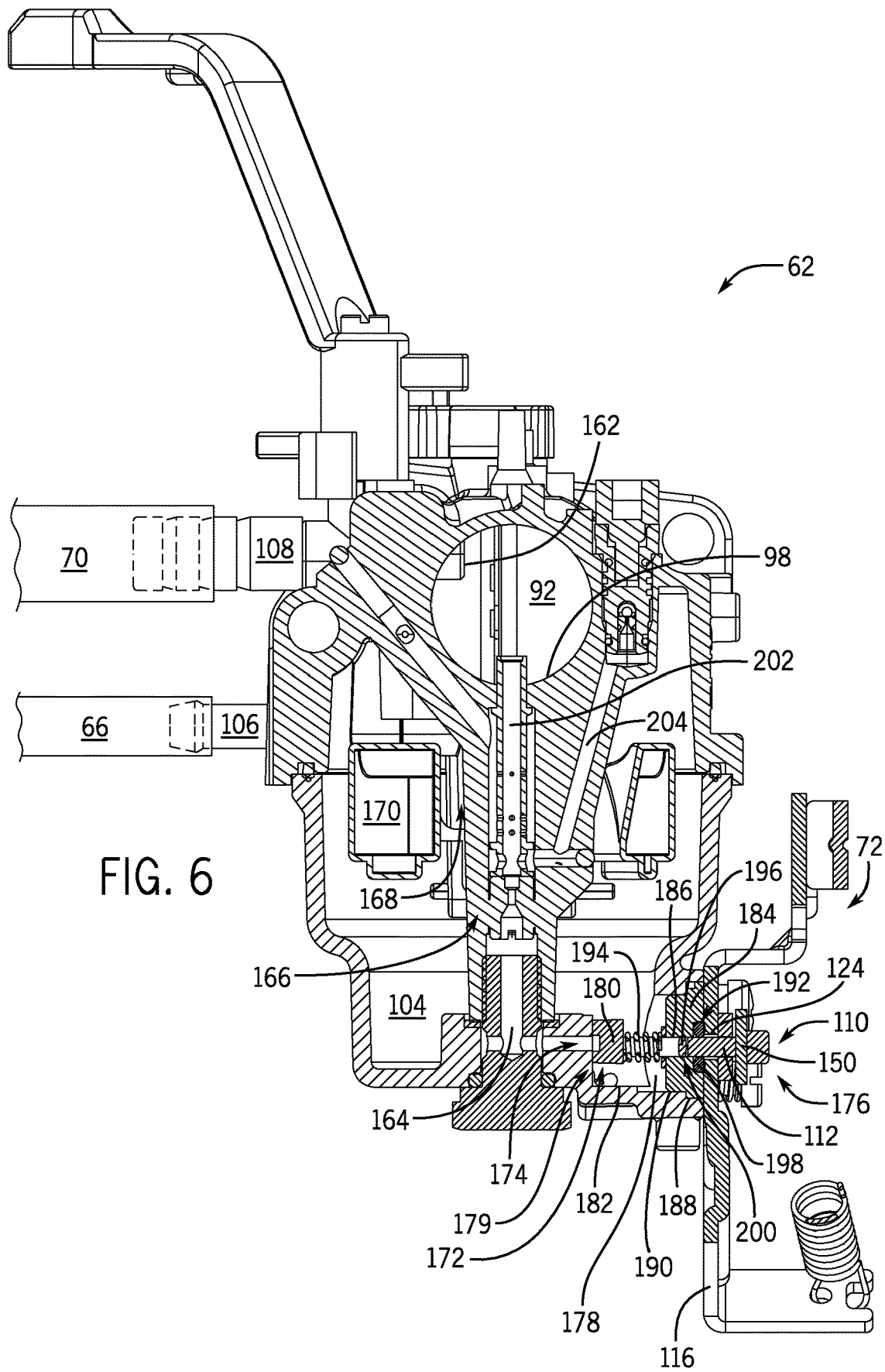
FIG. 6 is cross-sectional view of the carburetor of FIG. 5 taken along line 6-6 of FIG. 5 through a fuel passage that provides fuel from a float bowl to a throat of the carburetor, according to an embodiment of the invention.

Referring to FIG. 6, a cross-sectional view of the carburetor taken generally about line 6-6 of FIG. 5 is shown, in accordance with an embodiment of the invention. Carburetor 62 includes a throat 92 to mix gaseous fuel with air and liquid fuel with air. Throat 92 includes a gaseous fuel inlet port 162 in communication with gaseous fuel inlet 108 coupled to a second fuel line 70. Carburetor 62 also includes float bowl 104 and a fuel passage 164 to provide a liquid fuel path from float bowl 104 through a main nozzle 166 into venturi 98. Float bowl 104 has a liquid fuel inlet port 168 and a float valve 170 to regulate liquid fuel flow through liquid fuel inlet port 168. Liquid fuel inlet port 168 is in communication with the liquid fuel inlet 106 coupled to first fuel line 66.

Manual fuel shutoff 110 couples to carburetor 62 to regulate liquid fuel flow downstream of float bowl 104. Manual fuel shutoff 110 attaches to carburetor 62 to close fuel passage 164 upon selection of engine operation to gaseous fuel. Manual fuel shutoff 110 may have a first end 172 positioned in carburetor 62 adjacent an inlet port 174 to fuel passage 164, and the first end 172 actuates to close fuel passage 164. That is, first end 172 actuates between a first position to permit fuel flow into fuel passage 164, as shown in FIG. 7A, and a second position to prevent fuel flow into fuel passage 164, as shown in FIG. 8.

Referring back to FIG. 6, manual fuel shutoff 110 has a second end 176 positioned external to carburetor 62 that is manually actuated to operate manual fuel shutoff 110. Manual fuel shutoff 110 may have a rotating shaft 112 that extends through an opening 178 in carburetor 62. A blocking member or valve tip 180 couples to shaft 112 in carburetor 62 to create a valve-shaft assembly 179. Valve tip 180 rotates parallel to inlet 174 of fuel passage 164 between a blocking position and non-blocking position to selectively block fuel flow into fuel passage 164. Lever 150 couples to shaft 112 external to carburetor 62 and actuates to rotate shaft 112 and valve tip 180.

Shaft 112 may be horizontal or substantially horizontal to allow valve tip 180 to be positioned directly in float bowl 104 adjacent inlet port 174 of fuel passage 164. That is, manual fuel shutoff 110 may be coupled to carburetor 62 such that second end 176 is horizontal from first end 172. Inlet 174 of fuel passage 164 can face horizontal or substantially horizontal to accommodate valve tip 180 in float bowl 104. As such, fuel passage 164 may have a horizontal component that receives fuel from float bowl 104 leading to a vertical component to provide fuel to venturi 98. The interior surface of the float bowl 104 may also have a recess or cavity 182 to provide room for valve member 180 in the bowl.

Opening 178 in carburetor 62 has a plug 184 to hold shaft 112 and prevent fuel flow out of the carburetor. Shaft 112 extends through a hole 186 in plug 184 and hole 186 is positioned to align valve tip 180 with fuel passage 164. Plug 184 has a larger outer diameter 188 toward the external side of carburetor 62 and a smaller outer diameter 190 toward the internal side. Larger outer diameter 188 and smaller outer diameter 190 mate with corresponding diameters of opening 178. Plug 184 has a counterbore 192 to hole 186 on the external side of the plug. A compression spring 194 is positioned around shaft 112 in float bowl 104 to push valve tip 180 against plug 184. Compression spring 194 holds valve tip 180 against inlet 174 of fuel passage 164 in order to seal the fuel passage.

A primary o-ring 196 and a secondary o-ring 198 are positioned around shaft 112 to provide a respective first and second fuel seal between the shaft and plug 184 and to seal first end 172 of manual fuel shutoff 110 in carburetor 62. Primary o-ring 196 may be positioned in an o-ring groove 200 in shaft 112 and secondary o-ring 198 may be positioned in counterbore 192 of plug 184. A bracket 116 or other support member mounts over counterbore 192 and around shaft 112 to hold secondary o-ring 198 in counterbore 192. Bracket 116 has an opening 124 large enough for shaft 112 but small enough to hold secondary o-ring 198 in counterbore 192. Manual fuel shutoff 110 actuates in a rotative motion free from linear motion in part to ensure fuel will not leak through primary o-ring 196 or secondary o-ring 198. Compared to a sliding valve, a rotating valve, such as manual fuel shutoff 110, reduces the likelihood that fuel will leak from carburetor 62.

Liquid fuel cut-off 72 may regulate fuel flow through multiple fuel passages in carburetor 62 that provide fuel from float bowl 104 to the engine. For instance, carburetor 62 may have a main fuel circuit 202 and an idle fuel circuit 204. Main fuel circuit 202 provides fuel through main nozzle 166 into a narrow portion of venturi 98. Idle fuel circuit 204 provides fuel to throat 92 downstream from the throttle valve. Liquid fuel cut-off 72 may regulate fuel flow through some or all of the fuel circuits that provide fuel from float bowl 104 to the engine. FIG. 6 shows an embodiment where idle fuel circuit 204 branches off from main fuel circuit 202 and liquid fuel cut-off 72 actuates to block fuel flow into both main fuel circuit 202 and idle fuel circuit 204. In other embodiments, liquid fuel cut-off 72 closes main fuel circuit 202 while small amounts of liquid fuel pass through idle fuel circuit 204. Fuel passing through idle fuel circuit 204 may not negatively affect engine performance during LPG operation but will eventually drain the gasoline tank.

Referring to FIG. 7A, a partial sectional view of a float bowl shows a manual fuel shutoff system in an open position for gasoline mode, in accordance with an embodiment of the invention. The partial sectional view is taken through a portion of float bowl 104 along fuel passage 164 while showing another portion of float bowl 104 in front of fuel passage 164 and coupled to manual fuel shutoff 110. Inlet 174 to fuel passage 164 is in a boss 206 extending outward from a central region of float bowl 104. Boss 206 has an oval top with sides that extend to the floor of float bowl 104. Inlet 174 to fuel passage 164 extends through boss 206 and has a substantially flat perimeter edge 208 around inlet port 174 on the surface of the boss. Manual fuel shutoff 110 presses against substantially flat perimeter edge 208 surrounding fuel passage 164 to block fuel flow into fuel passage 164.

Manual fuel shutoff 110 may have a rotating shaft 112 extending through an aperture 178 in float bowl 104. Shaft 112 has a first end 210 coupled to valve tip 180 and located in float bowl 104 that is held against inlet port 174 to fuel passage 164. Shaft 112 rotates valve tip 180 against inlet port 174 between a first position 180(*a*) allowing fuel flow through the inlet port 174, as shown in FIG. 7A, and a second position 180(*b*) blocking fuel flow through the inlet port 174, as shown in FIG. 8. That is, valve tip 180 uncovers the inlet 174 of fuel passage 164 to permit fuel flow into the inlet 174 when rotated to first position 180(*a*), FIG. 7A, and covers inlet 174 of fuel passage 164 to prevent fuel flow into inlet 174 when rotated to second position 180(*b*), FIG. 8.

Referring back to FIG. 7A, the manual fuel shutoff system further includes bracket 116 to support shaft 112 in float bowl 104 and provide mounting locations for manually operated control system 114. Bracket 116 also has a pair of stopping tabs 126, 128 to hold the manual fuel shutoff 110 in an open or closed position. Shaft 112 extends through bracket 116 and lever 150 couples to a second end 212 of shaft 112 located outside of float bowl 104. Control system spring 136 couples lever 150 to bracket 116 to hold lever 150 against stopping tab 126 and hold manual fuel shutoff 110 in the open position for gasoline mode. Bowden cable 146 couples to lever 150 to pull against control system spring 136 and rotate manual fuel shutoff 110 to the closed position for LPG mode. As such, second end 176 of manual fuel shutoff 110 is positioned external to float bowl 104 and coupled to manually operated control system 114 to operate manual fuel shutoff 110.

Referring to FIG. 7B, a detailed partial sectional view of the float bowl of FIG. 7A taken along line 7B-7B shows a manual fuel shutoff in an open position for gasoline mode, in accordance with an embodiment of the invention. Float bowl 104 includes boss 206 through which fuel passage 164 extends and having a substantially flat perimeter edge 208 surrounding inlet 174 to fuel passage 164. Substantially flat perimeter edge 208 preferably has a flat finished surface for improved sealing against valve tip 180. Valve tip 180 maintains planar contact with substantially flat perimeter edge 208 while rotating between an open position permitting fuel flow into inlet 174 and a closed position blocking fuel flow into inlet 174. As such, valve tip 180 rotates parallel to inlet 174 of fuel passage 164 between the open or first position 180(a) and closed or second position 180(b), FIG. 8.

Referring again to FIG. 7B, valve tip 180 may comprise an oval or stadium 214 having a flat surface 216 that contacts perimeter edge 208 around inlet 174 of fuel passage 164. Valve tip 180 may have a recessed portion or cutout 218 in the flat surface 216 to provide a flow passage through the valve tip. Fuel flows through the cutout 218 into the inlet 174 of fuel passage 164 when cutout 218 is aligned with inlet 174. That is, cutout 218 in valve tip 180 aligns with inlet port 174 when valve tip 180 is rotated to the open position such that fuel can pass from float bowl 104 through cutout 218 into fuel passage 164. Cutout 218 in valve tip 180 is strategically positioned in a narrow portion of stadium 214 so a long portion of stadium 214 can be rotated to cover and block inlet 174. Valve tip 180 may comprise one of many shapes including a stadium, an oval, a disk, a rectangle, an irregular shape, among others.

Referring to FIG. 8, a partial sectional view of a float bowl shows a manual fuel shutoff system in a closed position for LPG mode, in accordance with an embodiment of the invention. Valve tip 180 pushes against inlet 174 to fuel passage 164 to seal the inlet when in second position 180(b). Valve tip 180 may have a stadium shape 214 with a cutout 218 in the narrow portion of the stadium to provide a flow passage. Valve tip 180 blocks fuel flow into fuel passage 164 when the cutout 218 in valve tip 180 is rotated away from inlet 174 of fuel passage 164. Cutout 218 may face downward when in the closed position and horizontal when in the open position. Lever 150 couples to shaft 112 outside of float bowl 104 and is actuated by Bowden cable 146 to operate manual fuel shutoff 110.

Bowden cable 146 may be coupled to mechanical fuel lockout switch 38, FIG. 1, to automatically open and close manual fuel shutoff 110 upon selection of a corresponding fuel source. Mechanical fuel lockout switch 38 may have a lever arm inside of the generator housing for actuating Bowden cable 146, FIG. 8. Alternatively, Bowden cable 146 may have a push-pull knob located on an external surface of the generator housing to independently actuate manual fuel shutoff 110. In either case, manual fuel shutoff 110 can attach to the carburetor to close fuel passage 164 downstream from float bowl 104 upon actuation of the mechanical fuel lockout switch 38, FIG. 1, from liquid fuel to gaseous fuel.

Figure 9:
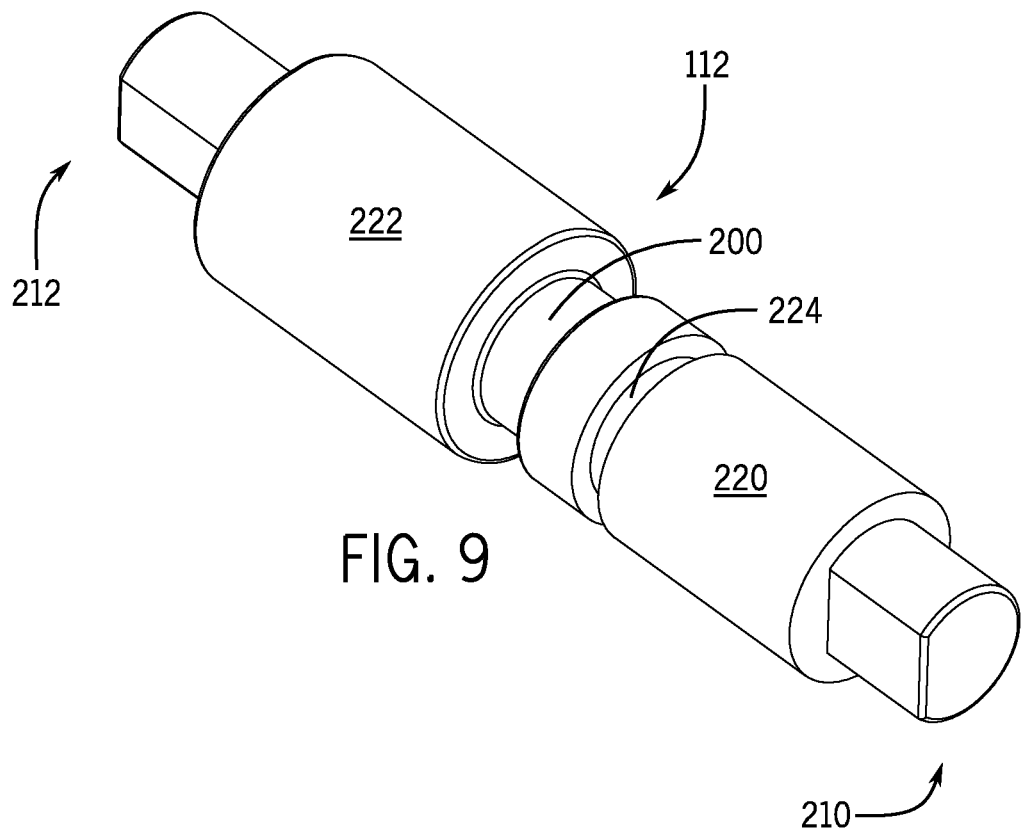
FIG. 9 is a perspective view of a shaft for the manual fuel shutoff system of FIG. 5, according to an embodiment of the invention.

Referring to FIG. 9, a perspective view of a shaft for the manual fuel shutoff system of FIGS. 5-8 is shown, in accordance with an embodiment of the invention. Shaft 112 has two "D" shaped ends each located at a respective first end 210 and second end 212 of the shaft. Shaft 112 also has a first diameter 220 and a larger second diameter 222 each extending radially from shaft 112 outward beyond the two "D" shaped ends. First diameter 220 and second diameter 222 are separated by o-ring groove 200 with first diameter 220 toward first end 210 of shaft 112 and second diameter 222 toward second end 212 of shaft 112. First diameter 220 also has a groove 224 for a retaining ring. Lever 150, FIG. 8, has a "D" shaped opening to fit on the second end 212 of shaft 112 and held against the second diameter 222.

Figure 10:
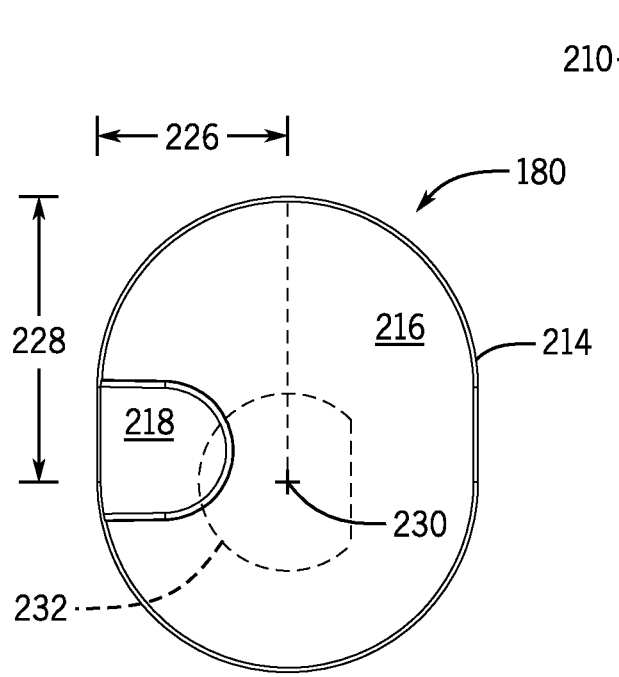
FIG. 10 is a side view of a valve member for the manual fuel shutoff system of FIG. 5, according to an embodiment of the invention.

Referring to FIG. 10, a side view of a valve member for the manual fuel shutoff system of FIG. 5-8 is shown, in accordance with an embodiment of the invention. Valve tip 180 has a flat surface 216 to seal and rotate against a mating surface in the carburetor. Valve tip 180 is preferably made from polyoxymethylene (POM) or other thermoplastic material to provide a surface suitable for sealing. Valve tip 180 may be shaped as a stadium 214 with a short direction 226 and a long direction 228 extending from a center of rotation 230. The long direction 228 rotates over inlet 174, FIG. 8, to selectively block fuel passage 164. As such, valve tip 180 may rotate less than 360 degrees between the open and closed positions, and valve tip 180 rotates substantially 90 degrees between the positions in an exemplary embodiment of the invention.

Referring back to FIG. 10, cutout 218 may be located along a straight side of stadium 214 to create a flow passage through valve tip 180. Cutout 218 may have a depth less than the thickness of stadium 214 or may extend through the thickness of the stadium. Cutout 218 may be a half circle with tangent side components extending perpendicular to a straight edge of stadium 214, through a side of valve tip 180. Cutout 218 may extend into valve tip 180 short of the center of stadium 214 and positioned slightly offset along the length of the stadium from the stadium center.

Valve tip 180 may have a "D" shaped opening 232 to press onto shaft 112 of FIG. 9, defining center of rotation 230, FIG. 10. Center of rotation 230 may be equal distance from straight edges of stadium 214 and positioned between cutout 218 and a rounded end of the stadium that is the closest rounded end to the cutout. Cutout 218 is askew from center of rotation 230 along the length of stadium 214 in part to cover more distance when rotated away from inlet port 174, FIG. 8. In addition, valve tip 180 is positioned off center on shaft 112 to increase the length of long direction 228 from center of rotation 230 that is rotated to cover inlet port 174.

Figure 11:
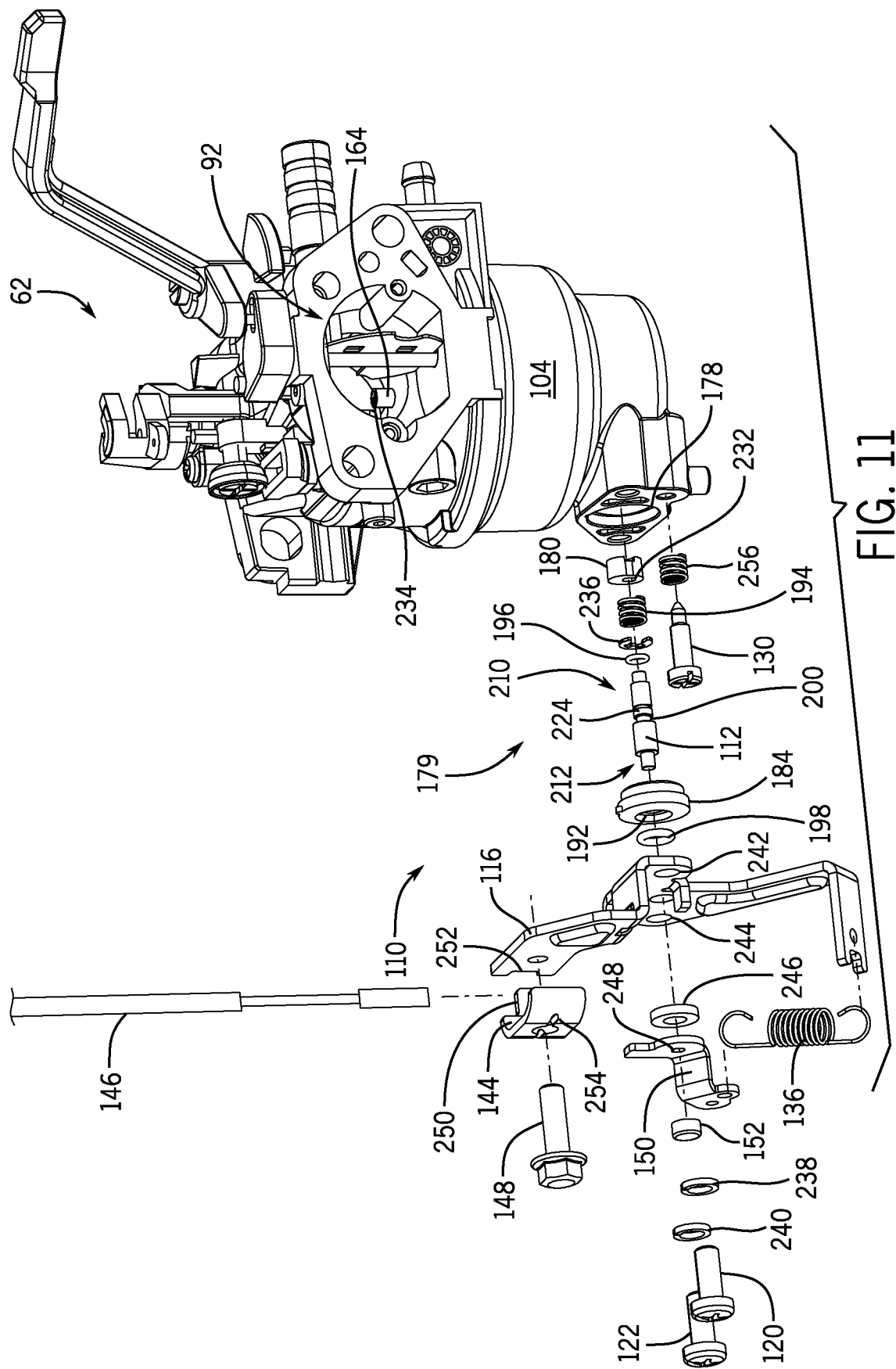
FIG. 11 is a perspective view of the carburetor of FIG. 5 with the manual fuel shutoff system exploded from a float bowl of the carburetor.

Referring to FIG. 11, a perspective view of the carburetor of FIG. 5 with the manual fuel shutoff system exploded from a float bowl of the carburetor is shown, in accordance with an embodiment of the invention. Carburetor 62 has a throat 92, a float bowl 104, and a fuel passage 164 from float bowl 104 to an outlet port 234 in throat 92. Manual fuel shutoff 110 includes shaft 112 having first end 210 to be positioned in float bowl 104 and a second end 212 to be positioned external to float bowl 104. A primary o-ring 196 installs on shaft 112 and positioned in an o-ring groove 200 in shaft 112. A retaining ring 236 installs on shaft 112 in a groove 224 toward first end 210 from o-ring groove 200. Compression spring 194 installs on shaft 112 followed by valve tip 180 pressed onto first end 210 of shaft 112 creating a valve-shaft assembly 179. Orientation of valve tip 180 is controlled by a "D" shaped hole 232 in valve tip 180 mating with a "D" shaped end of shaft 112.

Plug 184 installs on shaft 112 pushing compression spring 194 against valve tip 180. Primary o-ring 196 seals between shaft 112 and plug 184. Valve-shaft assembly 179 inserts through opening 178 in float bowl 104 and plug 184 presses into the opening. Plug 184 anchors in opening 178 so that compression spring 194 holds valve tip 180 against fuel passage 164. Secondary o-ring 198 installs around shaft 112 to seal between the shaft and plug 184. Secondary o-ring 198 may be positioned in a counterbore 192 in plug 184. Bracket 116 couples to float bowl 104 and holds secondary o-ring 198 positioned in counterbore 192. Bracket 116 may be 2.0 mm thick and stamped from Q235 grade steel. A pair of screws 120, 122 each having a spring lock washer 238, 240 extend through a respective hole 242, 244 in bracket 116 to mount bracket 116 to carburetor 62. Screws 120, 122 may be M5 screws. A spacer 246 installs on shaft 112 and against bracket 116.

Lever 150 couples to shaft 112 and held apart from bracket 116 by spacer 246. Shaft 112 has a "D" shape at second end 212 that is inserted into a corresponding "D" shaped opening 248 in lever 150. The orientation of lever 150 is controlled by "D" shape hole 248 in lever 150 mating with a "D" shape end of shaft 112. Lever 150 may be 1.5 mm thick and stamped from Q235 grade steel. Cap 152 presses onto shaft 112 to hold lever 150 on shaft 112. Control system spring 136 attaches to lever 150 and bracket 116 to hold manual fuel shutoff 110 open. Cable clamp 144 couples to bracket 116 by bolt 148. Cable clamp 144 has a tab 250 at one or both ends that fits into a corresponding slot or recess 252 in bracket 116. Cable clamp 144 also has a midsection with a notch 254 to pinch and hold Bowden cable 146 to bracket 116. Bowden cable 146 is held by cable clamp 144 and attaches to lever 150 to actuate manual fuel shutoff 110 to the closed position. Fuel drain screw 130 and drain screw spring 256 insert into carburetor 62. In one embodiment, drain screw spring 256 is the same type of spring used for compression spring 194.

Figure 12:
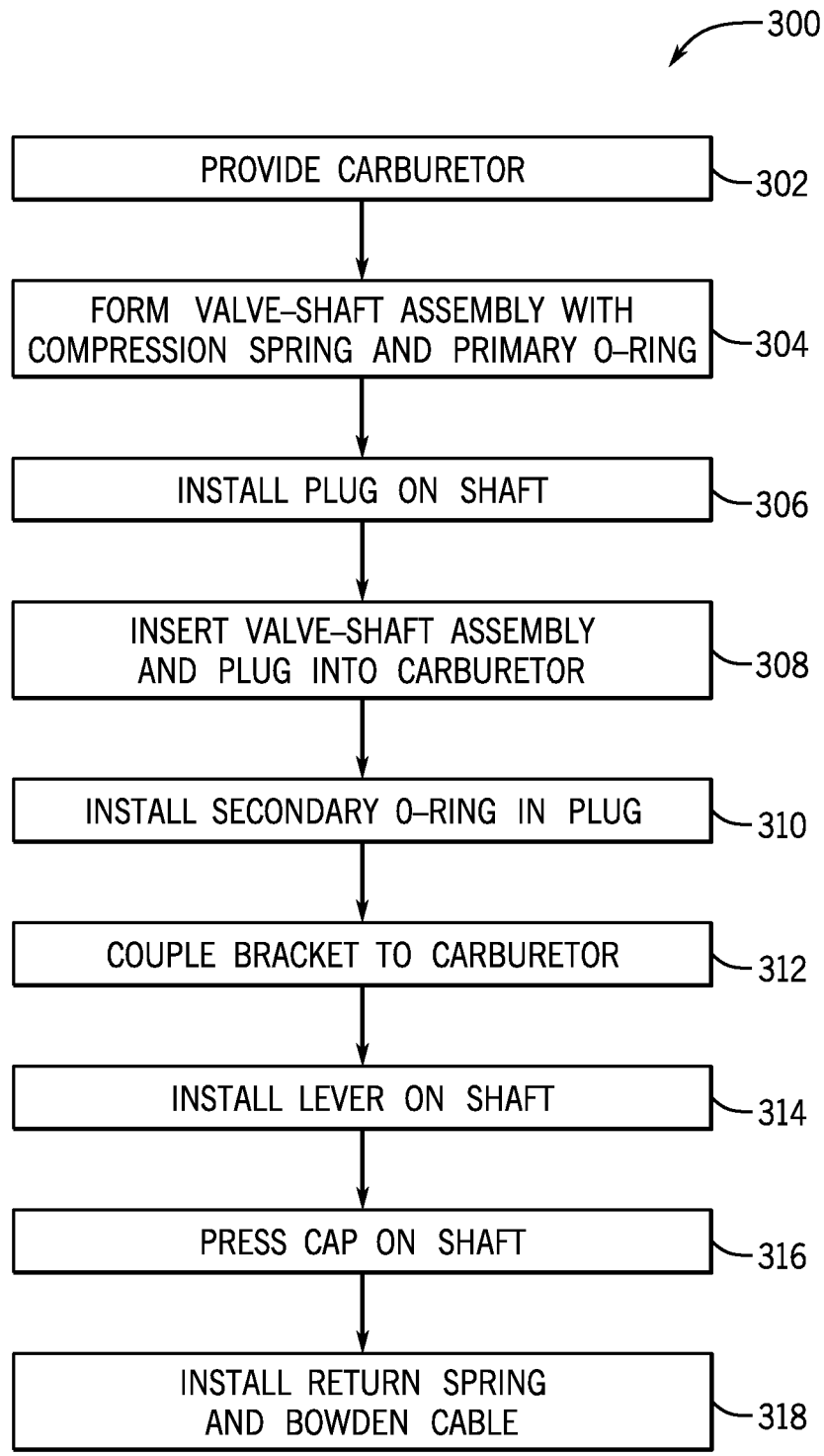
FIG. 12 is a flow chart showing steps in fabricating a manual fuel shutoff system for a carburetor, according to an embodiment of the invention.

Referring to FIG. 12, and with continued reference back to FIG. 11, a method of fabricating a manual fuel shutoff system for a carburetor is shown, in accordance with an embodiment of the invention. Process 300 begins by providing carburetor 62 at STEP 302. Process 300 continues with making a valve-shaft assembly 179 at STEP 304, with valve tip 180 pressed onto shaft 112. Also in STEP 304, a compression spring 194 is stalled on shaft 112 and primary o-ring 196 is installed around shaft 112. Process 300 continues by installing plug 184 on valve-shaft assembly 179 at STEP 306. Next, valve-shaft assembly 179 is inserted through opening 178 in float bowl 104 and plug 184 is pressed into the opening at STEP 308. Process 300 continues at STEP 310 by installing secondary o-ring 198 in a groove on plug 184. Next, bracket 116 is coupled to float bowl 104 of carburetor 62 in STEP 312. Process 300 continues at STEP 314 by installing lever 150 on shaft 112. Next, cap 152 is pressed onto shaft 112 to hold lever 150 to shaft 112 in STEP 316. In STEP 318, control system spring 136 is installed on lever 150 and bracket 116. Also, in STEP 318, Bowden cable 146 is attached to lever 150 to actuate shaft 112.

Figure 13:
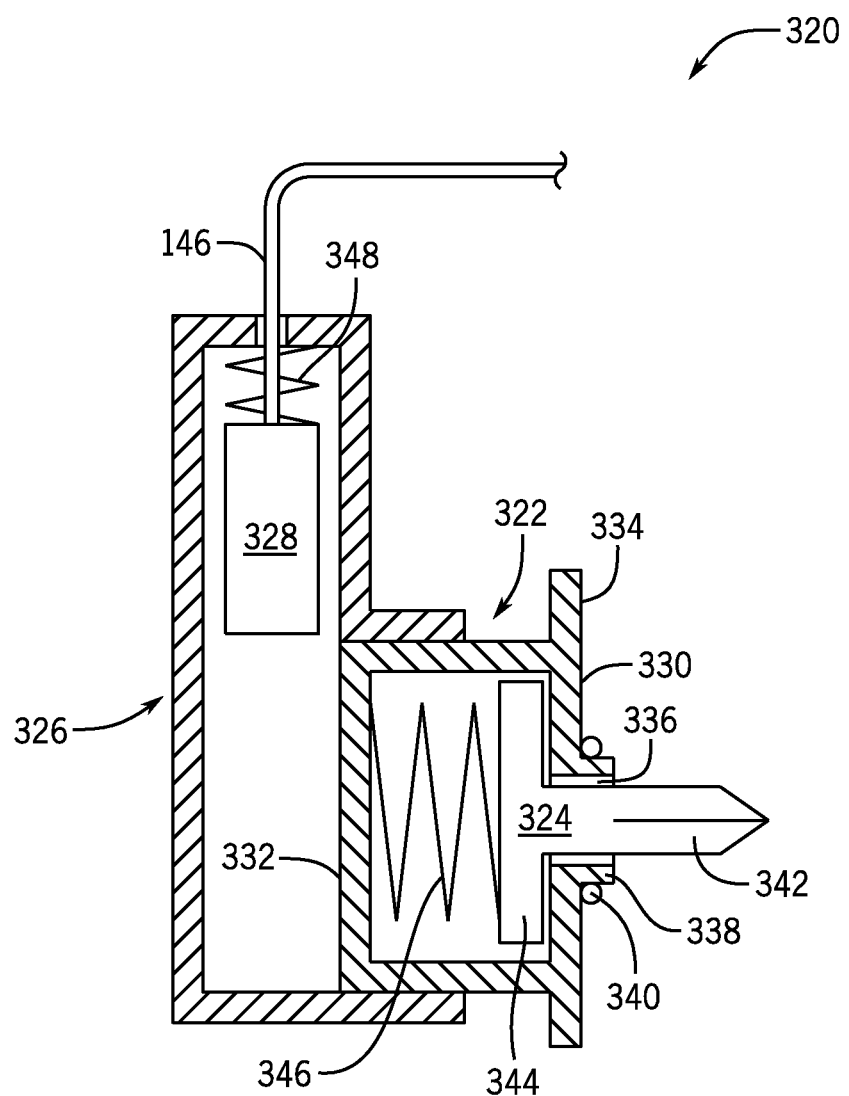
FIG. 13 is a magnetic fuel shutoff system for a carburetor, according to a magnetic-mechanical embodiment of the invention.

Referring to FIG. 13, a magnetic fuel shutoff system for a carburetor is shown, in accordance with an embodiment of the invention. Magnetic fuel shutoff system 320 couples to the carburetor to provide a magnetically actuated liquid fuel cut-off for the internal combustion engine. Magnetic fuel shutoff system 320 controls liquid fuel flow through a fuel passage leading from the float bowl to the throat in the carburetor. Magnetic fuel shutoff system 320 can be manually actuated between an open position to allow gasoline flow to the engine for gasoline operation and a closed position to prevent gasoline flow to the engine for LPG operation.

Magnetic fuel shutoff system 320 includes a housing at least partially enclosing the liquid fuel cut-off. That is, magnetic fuel shutoff system 320 has a first section 322 housing magnetic fuel shutoff 324 and a second section 326 housing a manually actuated magnet 328 to operate the magnetic fuel shutoff. First section 322 has a forward wall 330 and a back wall 332 with the forward wall facing internal to the carburetor. Forward wall 330 has a flange 334 around an outer perimeter for coupling to the carburetor. Forward wall 330 also has an opening 336 through which a plunger 342 of the magnetic fuel shutoff 324 extends into the carburetor. A lip 338 extends forward from forward wall 330 around opening 336 and an o-ring 340 is installed around lip 338. Flange 334 may be mounted to a plug in an opening of the carburetor with magnetic fuel shutoff 324 entering the carburetor through a hole in the plug.

First section 322 provides a sealing member enclosing plunger 342 of magnetic fuel shutoff 324 to the carburetor and holding fuel in the carburetor. The plunger 342 extends through opening 336 in forward wall 330 with a pointed end that is selectively inserted into a fuel supply path in the carburetor to block fuel flow downstream from the float bowl. Magnetic fuel shutoff 324 has a back plate 344 coupled to plunger 342 in first section 322. Plunger 342 extends perpendicular from a forward face of back plate 344. A spring 346 pushes a back face of back plate 344 against back wall 332 to push plunger 342 through opening 336 in forward wall 330 to block the fuel supply path in the carburetor. Accordingly, the first section 322 holds the spring 346 against the plunger 342. Magnetic fuel shutoff 324 is guided through its actuation by back plate 344 sliding through first section 322 and plunger 342 through opening 336 in forward wall 330.

Second section 326 couples to first section 322 and is located behind back wall 332. Second section 326 encloses an actuating magnet 328 to selectively pull magnetic fuel shutoff 324 against spring 346. Second section 326 preferably guides actuating magnet 328 along a path perpendicular to that of magnetic fuel shutoff 324. As such, the magnetic force to pull magnetic fuel shutoff 324 to an open valve position is the strongest when actuating magnet 328 is aligned with the path of magnetic fuel shutoff 324. Actuating magnet 328 pulls magnetic fuel shutoff 324 against spring 346 when actuating magnet 328 approaches magnetic fuel shutoff 324 and releases magnetic fuel shutoff 324 while traveling away from magnetic fuel shutoff 324. Actuating magnet 328 may comprise a rare-earth or other permanent magnet.

In an exemplary embodiment of the invention, magnetic fuel shutoff 324 actuates horizontally between an open position to permit fuel flow into a fuel passage in the carburetor and a closed positioned to prevent fuel flow into the fuel passage. Actuating magnet 328 preferably follows a vertical path and a spring 348 couples to a top of second section 326 pushing downward on actuating magnet 328. Bowden cable 146 couples to the top of second section 326 and to actuating magnet 328 to pull the magnet vertically against spring 348 and operate magnetic fuel shutoff system 320.

Figure 14:
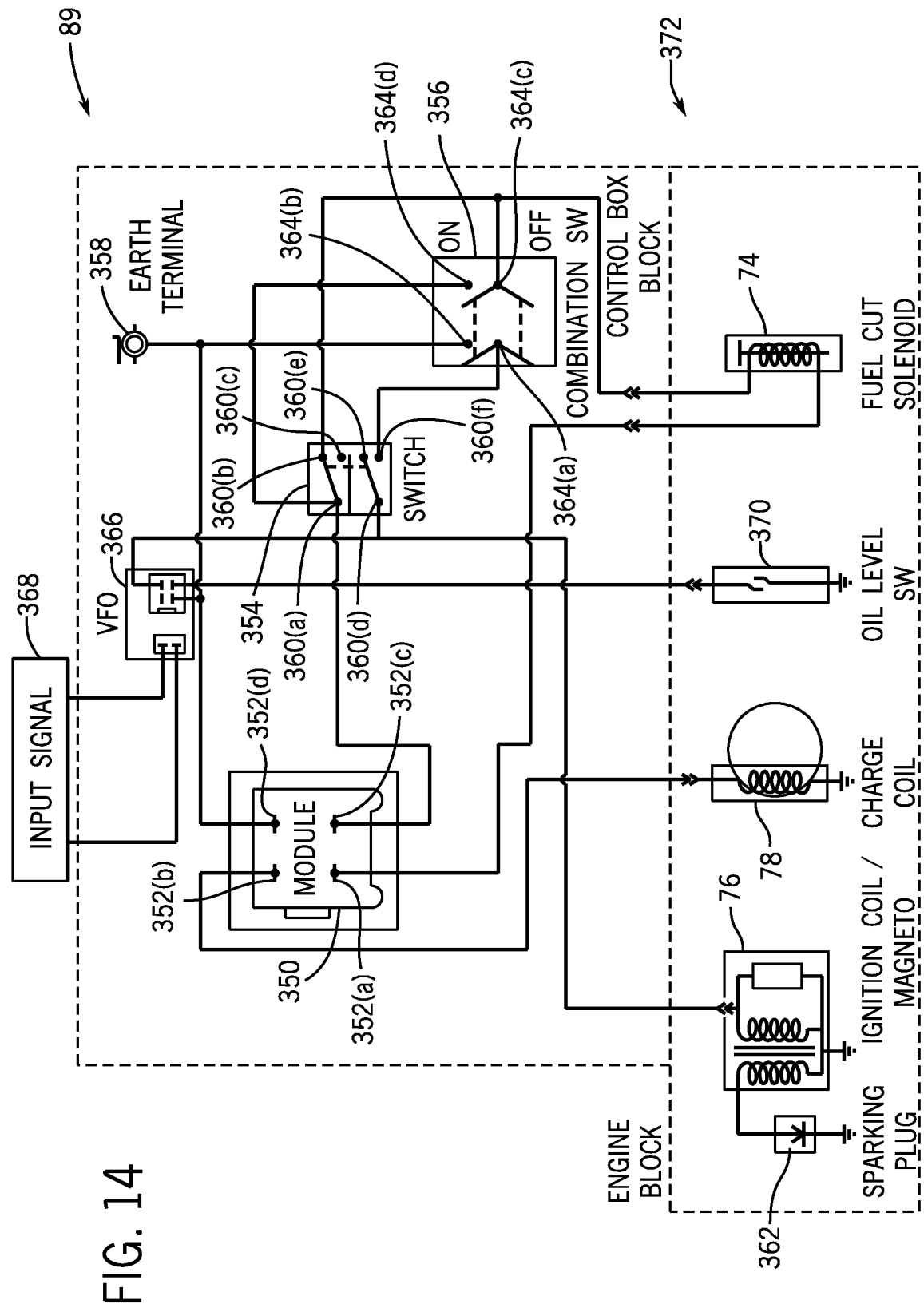
FIG. 14 is a wiring diagram of a microcontroller receiving input signals and operating engine components, according to an embodiment of the invention.

Referring now to FIG. 14, a wiring diagram of a microcontroller 89 receiving input signals and operating engine components is shown, according to an embodiment of the invention. Microcontroller 89 closes fuel cut solenoid 74 when the engine operates on LPG and opens the fuel cut solenoid to operate the engine on gasoline. For LPG mode, microcontroller 89 switches on power to fuel cut solenoid 74 to close the solenoid preventing the engine from drawing in gasoline from the float bowl of the carburetor. During shutdown from gasoline operation, microcontroller 89 can also power fuel cut solenoid 74 to a closed position preventing additional gasoline being drawn into the engine. While microcontroller 89 can operate fuel cut solenoid 74 operating in a normally open configuration, microcontroller 89 can also operate a fuel cut solenoid operating in a normally closed configuration.

Microcontroller 89 may include a module 350 to connect fuel cut solenoid 74, charging coil 78, switches and a ground terminal. Module 350 has a first connection 352($a$) to couple fuel cut solenoid 74 and a second connection 352($b$) to couple charging coil 78 to power the fuel cut solenoid. Fuel cut solenoid 74 may be coupled to a fuel switch 354 and a combination switch 356 that are also connected to module 350 via a third connection 352($c$). Fuel switch 354 changes operation of the engine between LPG and gasoline, and combination switch 356 can operate to kill the engine. A ground terminal 358 connects to module 350 via a fourth connection 352($d$) in order to ground fuel cut solenoid 74 via fuel switch 354 or combination switch 356.

In LPG mode, fuel switch 354 connects a first contact 360($a$) to a second contact 360($b$), instead of third contact 360($c$), to complete an electrical circuit for fuel cut solenoid 74 by connecting the fuel cut solenoid to ground terminal 358. A fuel cut solenoid 74 operating in a normally open configuration is therefore powered and closed to prevent gasoline flow from the fuel bowl of the carburetor to the engine. Fuel switch 354 also connects a fourth contact 360($d$) to a fifth contact 360($e$), instead of sixth contact 360($f$), to prevent combination switch 356 from grounding magneto 76 thereby maintaining power to spark plug 362.

In gasoline mode, fuel switch 354 connects first contact 360($a$) to third contact 360($c$) to interrupt an electrical circuit for fuel cut solenoid 74 by disconnecting the fuel cut solenoid from ground terminal 358. A fuel cut solenoid 74 operating in a normally open configuration is therefore unpowered and opened to allow gasoline flow from the fuel bowl of the carburetor to the engine. Fuel switch 354 also connects fourth contact 360($d$) to sixth contact 360($f$) to allow combination switch 356 to ground magneto 76 upon shutdown thereby interrupting power to spark plug 362.

Combination switch 356 can actuate fuel cut solenoid 74 upon engine shutdown from gasoline operation to prevent after-fire. That is, combination switch 356 connects a first point 364($a$) to a second point 364($b$) to kill the engine by connecting magneto 76 to ground terminal 358. At the same time, combination switch 356 connects a third point 364($c$) to a fourth point 364($d$) completing an electrical circuit for fuel cut solenoid 74 by connecting the solenoid to ground terminal 358. Fuel cut solenoid 74 is then powered and closed to prevent continued gasoline flow to the engine after combination switch 356 stops power supply to spark plug 362.

In one embodiment of the invention, combination switch 356 can operate as a kill switch only for gasoline operation. That is, combination switch 356 can be decoupled from magneto 76 by fuel switch 354 so that combination switch 356 cannot be actuated to shut down the engine during LPG operation. In another embodiment of the invention, combination switch 356 can operate as a kill switch for both gasoline operation and LPG operation. During LPG operation, combination switch 356 may actuate fuel switch 354 with actuation of combination switch 356 to ground magneto 76 and kill the engine. That is, combination switch 356 connects first point 364($a$) to second point 364($b$) and also actuates fuel switch 354 to connect fourth contact 360($d$) to sixth contact 360($f$) so that magneto 76 is coupled to ground terminal 358 killing the engine. At the same time, combination switch 356 connects third point 364($c$) to fourth point 364($d$) so that fuel cut solenoid 74 maintains connection to ground terminal 358 to remain closed even though fuel switch 354 interrupts connection between first contact 360($a$) and second contact 360($b$).

Microcontroller 89 may also include a Voltage Frequency and Low Oil Shutdown (VFO) module 366. VFO module 366 can measure parameters of an alternator driven by an engine in a generator. VFO module 366 monitors alternator voltage and frequency by receiving an input signal 368 from the alternator. Input signal 368 is 120 VAC and 60 Hz from the alternator as a monitoring point for VFO module 366. VFO module 366 allows the engine to run if alternator parameters are within preset limits and shuts down the engine if the parameters are outside the limits. VFO module 366 can also monitor oil volume within the engine by receiving an input signal from an oil level switch 370 shown in the wiring diagram engine block 372. VFO module 366 may allow the engine to operate only if the oil volume is greater than a preset lower limit and can shutdown the engine by initiating connection between the ignition coil or magneto 76 and ground terminal 358.

Beneficially, embodiments of the invention provide for a fuel lockout switch to ensure that two fuels are not simultaneously delivered to a dual fuel internal combustion engine and to efficiently convert operation of the engine between the fuel sources. Embodiments of the invention also provide for a dual fuel generator with a remotely mounted gaseous fuel regulator system. Embodiments of the invention also provide for a batteryless dual fuel internal combustion engine having a liquid fuel cut-off coupled to a carburetor to selectively interrupt liquid fuel.

Therefore, according to one embodiment of the invention, a dual fuel engine includes an engine operable on a gaseous fuel and a liquid fuel and a switch to change operation of the engine between gaseous fuel and liquid fuel. The dual fuel engine also includes a carburetor attached to an intake of the engine to mix air and fuel and connect to a gaseous fuel source and a liquid fuel source. A liquid fuel cut-off attaches to the carburetor to interrupt liquid fuel upon actuation of the switch from liquid fuel to gaseous fuel.

According to another embodiment of the invention, a batteryless dual fuel generator includes a housing containing a pull start engine coupled to drive an alternator, the engine operable on a gaseous fuel and a liquid fuel. A carburetor attaches to an intake of the engine and includes a throat to mix fuel with air, a float bowl, and a fuel passage to provide liquid fuel from the float bowl to the throat. The generator also includes a fuel shutoff attached to the carburetor to close the fuel passage upon selection of engine operation to gaseous fuel.

According to yet another embodiment of the invention, a carburetor having a fuel shutoff includes a carburetor with a float bowl, a throat, and a fuel passage to provide fuel from the float bowl to the throat. The carburetor further includes a fuel shutoff coupled to the carburetor having a first end in the carburetor that actuates to close the fuel passage and a second end external to the carburetor to actuate the first end, and the fuel shutoff can actuate free from linear motion.

According to yet another embodiment of the invention, a method of assembling a dual fuel engine includes providing an engine operable on a gaseous fuel and a liquid fuel. The method also includes attaching a carburetor to an intake of the engine, the carburetor includes a throat to mix gaseous fuel with air and liquid fuel with air, a float bowl, and a fuel passage to provide liquid fuel from the float bowl to the throat. The method also includes coupling a switch to the engine to change operation of the engine between gaseous fuel and liquid fuel and attaching a liquid fuel cut-off to the carburetor to close the fuel passage upon actuation of the switch from liquid fuel to gaseous fuel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dual fuel engine comprising:
   an engine operable on a gaseous fuel and a liquid fuel;
   a switch to change operation of the engine between gaseous fuel and liquid fuel;
   a carburetor attached to an intake of the engine to mix air and fuel and connect to a gaseous fuel source and a liquid fuel source;
   a liquid fuel valve positioned along a liquid fuel line coupling the liquid fuel source to the carburetor;
   a gaseous fuel valve positioned along a gaseous fuel line coupling the gaseous fuel source to the carburetor; and
   a liquid fuel cut-off incorporated into the carburetor to interrupt liquid fuel upon actuation of the switch from liquid fuel to gaseous fuel.

2. The dual fuel engine of claim 1, wherein the engine is a pull start, batteryless engine.

3. The dual fuel engine of claim 1, wherein the gaseous fuel is LPG and the liquid fuel is gasoline.

4. The dual fuel engine of claim 1, wherein the engine is a pull-start engine having an electrical power generator to supply electrical power.

5. The dual fuel engine of claim 4, wherein the switch is an electro-mechanical switch connecting one fuel source to the carburetor and connected to the electrical power generator; and
   wherein the liquid fuel cut-off is a solenoid connected to open and close a fuel path to the pull-start engine in response to reception of electrical power from the switch.

6. The dual fuel engine of claim 4, wherein the liquid fuel cut-off is a solenoid valve that operates within the carburetor to control liquid fuel flow to the engine and is powered by the electrical power generator.

7. The dual fuel engine of claim 6, wherein the switch selectively powers the solenoid valve by controlling electrical connection between the solenoid valve and the electrical power generator.

8. The dual fuel engine of claim 6, wherein the solenoid valve is normally open to provide liquid fuel to the engine when the solenoid valve is unpowered.

9. The dual fuel engine of claim 8, wherein a pull-starter drives the electrical power generator to power and close the solenoid valve while starting the engine on gaseous fuel.

10. The dual fuel engine of claim 6, wherein the electrical power generator comprises a magneto or an alternator coupled to a voltage regulator to provide a regulated voltage to the solenoid valve.

11. The dual fuel engine of claim 6, wherein the solenoid valve is open to provide liquid fuel to the engine when the solenoid valve is powered.

12. The dual fuel engine of claim 11, wherein a pull-starter drives the electrical power generator to power and open the solenoid valve while starting the engine on liquid fuel.

13. The dual fuel engine of claim 6 further comprising a microcontroller to close the solenoid valve when the engine operates on gaseous fuel and open the solenoid valve to operate the engine on liquid fuel.

14. The dual fuel engine of claim 13, wherein the microcontroller closes the solenoid valve during engine shutdown from operation on liquid fuel.

15. The dual fuel engine of claim 1, wherein the liquid fuel cut-off is manually actuated to interrupt liquid fuel.

16. The dual fuel engine of claim 1, wherein the liquid fuel cut-off actuates to interrupt liquid fuel free from linear motion.

17. The dual fuel engine of claim 1, wherein the liquid fuel cut-off comprises:
    a rotating shaft extending through an aperture in the carburetor;
    a fuel seal around the shaft to seal the aperture; and
    a blocking member coupled to the shaft in the carburetor that rotates between a blocking and a non-blocking position to selectively block a liquid fuel path to the engine.

18. The dual fuel engine of claim 17 further comprising:
    a lever coupled to the shaft outside the carburetor;
    a spring coupled to the lever to hold the blocking member in either the blocking or non-blocking position; and
    a cable coupled to the lever to pull against the spring and rotate the blocking member to the other of the blocking or non-blocking positions.

19. The dual fuel engine of claim 1, wherein the liquid fuel cut-off is magnetically actuated to selectively interrupt liquid fuel.

20. The dual fuel engine of claim 1 further comprising:
    a spring pushing the liquid fuel cut-off to interrupt liquid fuel; and
    an actuating magnet coupled to the carburetor to selectively pull the liquid fuel cut-off against the spring away from a position interrupting liquid fuel.

21. The dual fuel engine of claim 20 further comprising a housing at least partially enclosing the liquid fuel cutoff, the housing including:
    a first section enclosing a plunger of the liquid fuel cut-off to the carburetor and holding the spring against the plunger; and a second section coupled to the first section and enclosing the actuating magnet.

22. The dual fuel engine of claim 1, wherein the liquid fuel cut-off is physically attached to an outer surface of the carburetor.

23. A batteryless dual fuel generator comprising:
a housing containing a pull start engine coupled to drive an alternator, the engine operable on a gaseous fuel and a liquid fuel;
a carburetor attached to an intake of the engine comprising:
a throat to mix fuel with air,
a float bowl, and
a fuel passage extending from the float bowl to the throat to provide liquid fuel; and
a fuel shutoff attached to the carburetor to close the fuel passage upon selection of engine operation to gaseous fuel.

24. The batteryless dual fuel generator of claim 23, wherein the fuel shutoff actuates to close the fuel passage free from linear motion.

25. The batteryless dual fuel generator of claim 23, wherein the fuel shutoff comprises:
a rotating shaft extending through an opening in the carburetor; and
a valve member coupled to the shaft in the carburetor that rotates to control fuel flow into the fuel passage.

26. The batteryless dual fuel generator of claim 25, wherein the valve member is positioned in the float bowl and the shaft extends substantially horizontal through the opening.

27. The batteryless dual fuel generator of claim 25, wherein the valve member has a flow passage that aligns with the fuel passage to control fuel flow into the fuel passage.

28. The batteryless dual fuel generator of claim 25 further comprising:
a compression spring on the shaft in the carburetor pushing the valve member to close the fuel passage; and
a plug in the opening surrounding the shaft to hold the compression spring against the valve member.

29. The batteryless dual fuel generator of claim 28 further comprising:
a lever coupled to the shaft outside the carburetor; and
a cable coupled to the lever to actuate the valve member to open and close the fuel passage.

30. The batteryless dual fuel generator of claim 28 further comprising one or more fuel seals within the plug to seal around the shaft.

31. The batteryless dual fuel generator of claim 23, wherein the fuel shutoff is magnetically actuated to selectively close the fuel passage, controlled by a manually actuated magnet coupled to the carburetor.

32. The batteryless dual fuel generator of claim 23 further comprising:
a spring pushing the fuel shutoff to close the fuel passage; and
an actuating magnet coupled to the carburetor to selectively pull the fuel shutoff against the spring to open the fuel passage.

33. The batteryless dual fuel generator of claim 32 further comprising a housing at least partially enclosing the fuel shutoff, the housing including:
a first section enclosing a plunger of the fuel shutoff to the carburetor and holding the spring against the plunger; and
a second section coupled to the first section and enclosing the actuating magnet.

34. The batteryless dual fuel generator of claim 23, wherein the fuel shutoff is a carburetor cutoff solenoid; and wherein the generator further comprises:
a charge winding to generate electrical power to operate the carburetor cutoff solenoid, and
a switch to selectively power the carburetor cutoff solenoid by controlling electrical connection between the carburetor cutoff solenoid and the charge winding.

35. The batteryless dual fuel generator of claim 34, wherein the carburetor cutoff solenoid is normally open to provide liquid fuel to the engine when the carburetor cutoff solenoid is unpowered.

36. The batteryless dual fuel generator of claim 35, wherein a pull-starter drives the engine operating the charge winding to power and close the carburetor cutoff solenoid while starting the engine on gaseous fuel.

37. The batteryless dual fuel generator of claim 34, wherein the switch is an electro-mechanical switch connected to the charge winding and connecting at least one fuel source to the carburetor to selectively control fuel flow from the at least one fuel source to the carburetor.

38. The batteryless dual fuel generator of claim 34, wherein the charge winding is coupled to a voltage regulator to provide a regulated voltage to the carburetor cutoff solenoid.

39. The batteryless dual fuel generator of claim 34, wherein the carburetor cutoff solenoid is open to provide liquid fuel to the engine when the carburetor cutoff solenoid is powered.

40. The batteryless dual fuel generator of claim 39, wherein a pull-starter drives the engine operating the charge winding to power and open the carburetor cutoff solenoid while starting the engine on liquid fuel.

41. The batteryless dual fuel generator of claim 34, wherein the switch is a microcontroller configured to close the carburetor cutoff solenoid when the engine operates on gaseous fuel and to open the carburetor cutoff solenoid to operate the engine on liquid fuel.

42. The batteryless dual fuel generator of claim 41, wherein the microcontroller closes the carburetor cutoff solenoid during engine shutdown from operation on liquid fuel.

43. A carburetor having a fuel shutoff comprising:
a carburetor comprising:
a float bowl,
a throat, and
a fuel passage extending from the float bowl to the throat; and
a fuel shutoff coupled to the carburetor having a first end in the carburetor that actuates to close the fuel passage and a second end external to the carburetor to actuate the first end; and
wherein the fuel shutoff actuates free from linear motion.

44. The carburetor having a fuel shutoff of claim 43, wherein the fuel shutoff is a manually actuated fuel shutoff.

45. The carburetor having a fuel shutoff of claim 43, wherein the fuel shutoff comprises a shaft extending into the carburetor through an aperture in the float bowl and coupled to a valve tip in the float bowl that rotates to open and close the fuel passage.

46. The carburetor having a fuel shutoff of claim 45, wherein the valve tip rotates parallel to an inlet of the fuel passage between a first position permitting fuel flow into the inlet and a second position blocking fuel flow into the inlet.

47. The carburetor having a fuel shutoff of claim 45, wherein the fuel passage has an inlet with a substantially flat perimeter edge and the valve tip maintains planar contact with the perimeter edge while rotating to open and close the fuel passage.

48. The carburetor having a fuel shutoff of claim 47, wherein the shaft is substantially horizontal and the inlet of the fuel passage faces substantially horizontal.

49. The carburetor having a fuel shutoff of claim 47 further comprising:
a plug in the aperture around the shaft; and
a compression spring around the shaft in the float bowl pushing against the plug to hold the valve tip against the perimeter edge of the inlet.

50. The carburetor having a fuel shutoff of claim 49 further comprising a first fuel seal between the shaft and plug, the first fuel seal comprising a primary o-ring in an o-ring groove in the shaft.

51. The carburetor having a fuel shutoff of claim 50 further comprising:
a second fuel seal between the shaft and plug, the second fuel seal comprising a secondary o-ring in a counterbore in the plug; and
a support member mounted over the counterbore around the shaft to hold the secondary o-ring in the counterbore.

52. The carburetor having a fuel shutoff of claim 45 further comprising:
a lever coupled to the shaft outside of the carburetor;
a spring coupled to the lever to hold the fuel shutoff opening the fuel passage; and
a cable coupled to the lever to move the lever against the spring and rotate the fuel shutoff to close the fuel passage.

53. The carburetor having a fuel shutoff of claim 45, wherein the valve tip comprises thermoplastic.

54. The carburetor having a fuel shutoff of claim 45, wherein the valve tip comprises one of an oval and stadium shape.

55. The carburetor having a fuel shutoff of claim 45, wherein the valve tip has a cutout that aligns with the fuel passage to open the fuel passage.

56. The carburetor having a fuel shutoff of claim 43, wherein the fuel shutoff extends through an opening into the float bowl such that the first end actuates in the float bowl to close the fuel passage.

57. A method of assembling a dual fuel engine comprising:
providing an engine operable on a gaseous fuel and a liquid fuel;
attaching a carburetor to an intake of the engine, the carburetor comprising:
a throat to mix gaseous fuel with air and liquid fuel with air,
a float bowl, and
a fuel passage extending from the float bowl to the throat to provide liquid fuel;
coupling a switch to the engine to change operation of the engine between gaseous fuel and liquid fuel; and
attaching a liquid fuel cut-off to the carburetor to close the fuel passage upon actuation of the switch from liquid fuel to gaseous fuel.

58. The method of claim 57 further comprising coupling a manually operated control operatively to the liquid fuel cut-off.

59. The method of claim 57, wherein attaching the liquid fuel cut-off to the carburetor comprises:
providing a shaft having a valve tip located at an end of the shaft;
installing a compression spring on the shaft;
installing a plug on the shaft so that the compression spring is positioned between the plug and the valve tip; and
anchoring the plug in an aperture in the carburetor so that the compression spring holds the valve tip to an inlet of the fuel passage.

60. The method of claim 59, wherein providing the shaft having a valve tip located at an end of the shaft comprises pressing the valve tip onto the shaft.

61. The method of claim 59 further comprising positioning at least one fuel seal on the shaft to seal between the shaft and plug.

62. The method of claim 59, wherein the shaft rotates the valve tip between a first position allowing fuel flow into the fuel passage and a second position blocking fuel flow into the fuel passage.

63. The method of claim 62, wherein the valve tip comprises an oval or stadium shape with a cutout in the oval or stadium shape that aligns with the fuel passage when the valve tip is rotated to the first position such that fuel can pass through the cutout into the fuel passage.

64. The method of claim 62 further comprising:
coupling a lever to the shaft;
attaching a control spring to the lever to actuate the shaft to one of the first position and second position; and
attaching a cable to the lever to actuate the shaft to the other of the first position and second position.

* * * * *